(12) United States Patent
Chen

(10) Patent No.: US 8,988,796 B1
(45) Date of Patent: Mar. 24, 2015

(54) IMAGE CAPTURING LENS SYSTEM, IMAGING DEVICE AND MOBILE TERMINAL

(71) Applicant: Largan Precision Co., Ltd., Taichung (TW)

(72) Inventor: Wei-Yu Chen, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 14/105,811

(22) Filed: Dec. 13, 2013

(30) Foreign Application Priority Data

Oct. 29, 2013 (TW) .............................. 102139029 A

(51) Int. Cl.
*G02B 9/34* (2006.01)
*G02B 3/02* (2006.01)
*G02B 13/00* (2006.01)

(52) U.S. Cl.
CPC ................ *G02B 13/004* (2013.01); *G02B 9/34* (2013.01)
USPC ............................ 359/779; 359/781; 359/715

(58) Field of Classification Search
USPC ........................... 359/771, 772, 779, 781, 715
See application file for complete search history.

(56) References Cited

U.S. PATENT DOCUMENTS 8,842,379 B2 9/2014 Hsu et al.
2010/0165485 A1 7/2010 Do

FOREIGN PATENT DOCUMENTS

JP 2014-178623 9/2014

*Primary Examiner* — Jack Dinh
(74) *Attorney, Agent, or Firm* — Morris Manning & Martin LLP; Tim Tingkang Xia, Esq.

(57) ABSTRACT

An image capturing lens system includes, in order from an object side to an image side, a first lens element, a second lens element, a third lens element and a fourth lens element. The first lens element has refractive power. The second lens element with positive refractive power has a convex image-side surface in a paraxial region thereof. The third lens element with negative refractive power has a concave object-side surface in a paraxial region thereof and a convex image-side surface in a paraxial region thereof. The fourth lens element with refractive power has a concave image-side surface in a paraxial region thereof, wherein both of an object-side surface and the image-side surface thereof are aspheric, and the image-side surface thereof has at least one convex shape in an off-axis region thereof. The image capturing lens system has a total of four lens elements with refractive power.

26 Claims, 23 Drawing Sheets

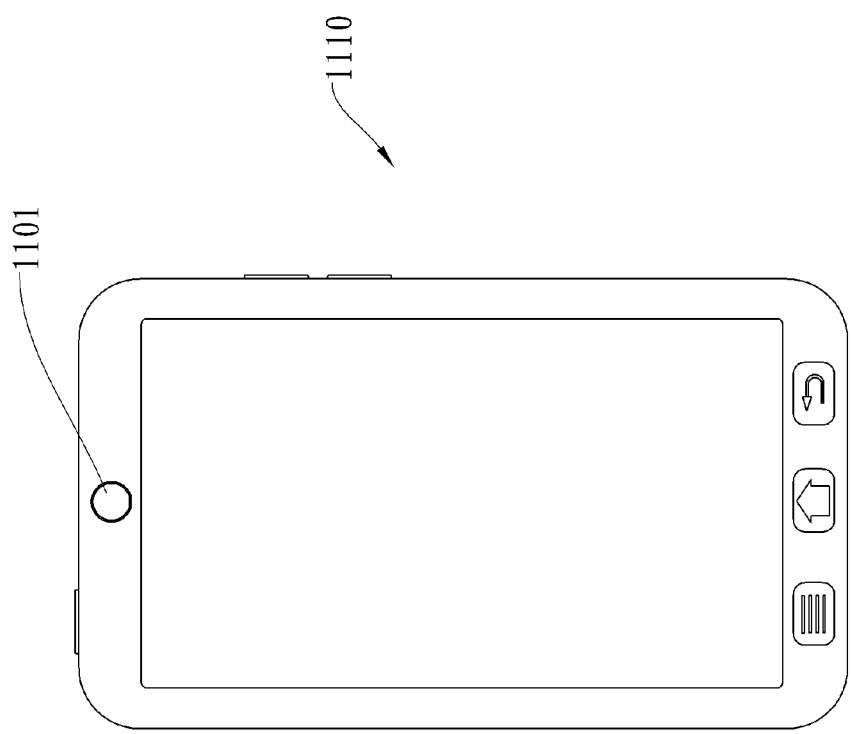

IMAGE CAPTURING LENS SYSTEM, IMAGING DEVICE AND MOBILE TERMINAL

RELATED APPLICATIONS

This application claims priority to Taiwan Application Serial Number 102139029, filed Oct. 29, 2013, which is incorporated by reference herein in its entirety.

BACKGROUND

1. Technical Field

The present disclosure relates to an image capturing lens system. More particularly, the present disclosure relates to a compact image capturing lens system applicable to a mobile terminal.

2. Description of Related Art

In recent years, with the popularity of mobile terminals having camera functionalities, the demand of miniaturized optical systems has been increasing. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional compact optical system in a portable electronic product typically utilizes a three-element lens structure. Due to the popularity of mobile products with high-end specifications, such as smart phones, tablet personal computers, wearable apparatus and other high-end mobile terminals, the requirements for high resolution and image quality of present compact optical systems increase significantly. However, the conventional optical systems cannot satisfy these requirements of the compact optical systems.

Another conventional compact optical system provides a four-element lens structure. However, it is hard to make a good balance between obtaining a large field of view and a short total track length. Furthermore, it is also not favorable for the resolving power and illumination in a peripheral region of an image; therefore, it cannot satisfy the requirements of the compact optical systems featuring better image quality.

SUMMARY

According to one aspect of the present disclosure, an image capturing lens system includes, in order from an object side to an image side, a first lens element, a second lens element, a third lens element and a fourth lens element. The first lens element has refractive power. The second lens element with positive refractive power has a convex image-side surface in a paraxial region thereof. The third lens element with negative refractive power has a concave object-side surface in a paraxial region thereof and a convex image-side surface in a paraxial region thereof. The fourth lens element with refractive power has a concave image-side surface in a paraxial region thereof, wherein both of an object-side surface and the image-side surface of the fourth lens element are aspheric, and the image-side surface of the fourth lens element has at least one convex shape in an off-axis region thereof. The image capturing lens system has a total of four lens elements with refractive power. When an axial distance between an object-side surface of the first lens element and the image-side surface of the fourth lens element is Td, half of a maximal field of view of the image capturing lens system is HFOV, a focal length of the image capturing lens system is f, a focal length of the fourth lens element is f4, a focal length of the second lens element is f2, and a focal length of the third lens element is f3, the following conditions are satisfied:

$0.5 \text{ mm} < Td < 3.2 \text{ mm}$;

$1.0 \text{ mm} < Td/\tan(HFOV) < 3.75 \text{ mm}$;

$|f/f4| < 1.20$; and $f2/f3 < -0.65$.

According to another aspect of the present disclosure, an image capturing lens system includes, in order from an object side to an image side, a first lens element, a second lens element, a third lens element and a fourth lens element. The first lens element has refractive power. The second lens element with positive refractive power has a convex image-side surface in a paraxial region thereof. The third lens element with negative refractive power has a concave object-side surface in a paraxial region thereof and a convex image-side surface in a paraxial region thereof. The fourth lens element with refractive power has a concave image-side surface in a paraxial region thereof, wherein both of an object-side surface and the image-side surface of the fourth lens element are aspheric, and the image-side surface of the fourth lens element has at least one convex shape in an off-axis region thereof. The image capturing lens system has a total of four lens elements with refractive power. When an axial distance between an object-side surface of the first lens element and the image-side surface of the fourth lens element is Td, half of a maximal field of view of the image capturing lens system is HFOV, a focal length of the image capturing lens system is f, a focal length of the fourth lens element is f4, and a focal length of the third lens element is f3, the following conditions are satisfied:

$0.5 \text{ mm} < Td < 3.2 \text{ mm}$;

$1.0 \text{ mm} < Td/\tan(HFOV) < 3.75 \text{ mm}$;

$|f/f4| < 1.20$; and $-2.0 < f/f3 < -0.95$.

According to still another aspect of the present disclosure, an image capturing lens system includes, in order from an object side to an image side, a first lens element, a second lens element, a third lens element and a fourth lens element. The first lens element has refractive power. The second lens element with positive refractive power has a convex image-side surface in a paraxial region thereof. The third lens element with negative refractive power has a concave object-side surface in a paraxial region thereof and a convex image-side surface in a paraxial region thereof. The fourth lens element with refractive power has a concave image-side surface in a paraxial region thereof, wherein both of an object-side surface and the image-side surface of the fourth lens element are aspheric, and the image-side surface of the fourth lens element has at least one convex shape in an off-axis region thereof. The image capturing lens system has a total of four lens elements with refractive power. When an axial distance between an object-side surface of the first lens element and the image-side surface of the fourth lens element is Td, half of a maximal field of view of the image capturing lens system is HFOV, a focal length of the image capturing lens system is f, a focal length of the fourth lens element is f4, and an f-number of the image capturing lens system is Fno, the following conditions are satisfied:

$0.5 \text{ mm} < Td < 3.2 \text{ mm}$;

$1.0 \text{ mm} < Td/\tan(HFOV) < 3.75 \text{ mm}$;

$|f/f4| < 1.20$; and $1.40 < Fno \leq 2.25$.

According to yet another aspect of the present disclosure, an imaging device includes the image capturing lens system according to the aforementioned aspect and an image sensor, wherein the image sensor is located on an image plane of the image capturing lens system.

According to still yet another aspect of the present disclosure, a mobile terminal includes the imaging device according to the aforementioned aspect.

BRIEF DESCRIPTION OF THE DRAWINGS

The disclosure can be more fully understood by reading the following detailed description of the embodiments, with reference made to the accompanying drawings as follows:

FIG. 11A shows a smart phone with an imaging device of the present disclosure installed therein;

DETAILED DESCRIPTION

Figure 1A:
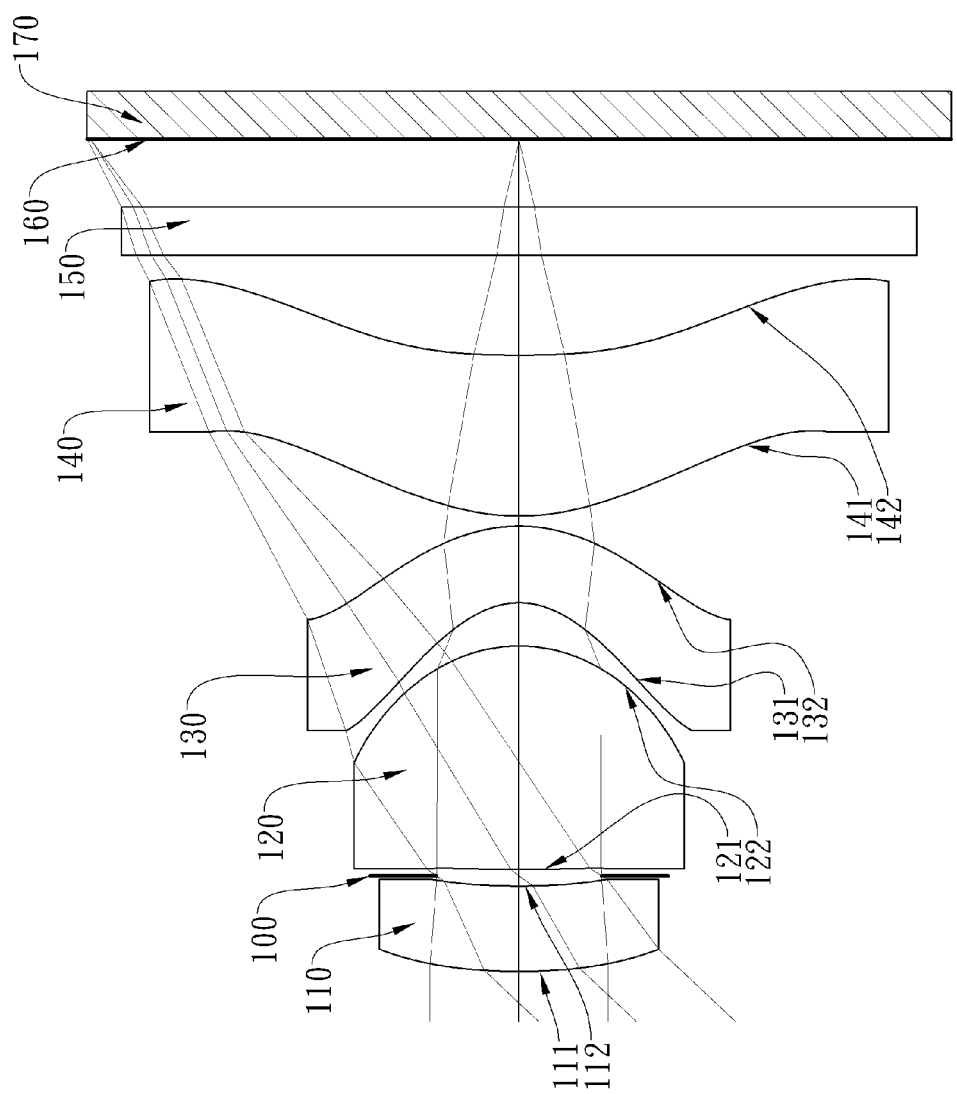
FIG. 1A is a schematic view of an imaging device according to the 1st embodiment of the present disclosure.

An image capturing lens system includes, in order from an object side to an image side, a first lens element, a second lens element, a third lens element and a fourth lens element. The image capturing lens system has a total of four lens elements with refractive power.

The first lens element can have positive refractive power, so that it provides the image capturing lens system with the positive refractive power as it needs to be so as to reduce the total track length of the image capturing lens system. The first lens element can have a convex object-side surface in a paraxial region thereof, so that it is favorable for further reducing the total track length.

The second lens element has positive refractive power, so that it is favorable for the second lens element adjusting the light gathering ability of the first lens element. The second lens element has a convex image-side surface in a paraxial region thereof, so that it is favorable for correcting the astigmatism of the image capturing lens system.

The third lens element has negative refractive power, so that it is favorable for correcting the aberration of the image capturing lens system. The third lens element has a concave object-side surface in a paraxial region thereof and a convex image-side surface in a paraxial region thereof, so that it is favorable for correcting the astigmatism of the image capturing lens system.

The fourth lens element can have a convex object-side surface in a paraxial region thereof and has a concave image-side surface in a paraxial region thereof. Furthermore, the image-side surface of the fourth lens element has at least one convex shape in an off-axis region thereof. Therefore, it is favorable for correcting the astigmatism and aberration of the off-axis.

When an axial distance between the object-side surface of the first lens element and the image-side surface of the fourth lens element is Td, and the following condition is satisfied: 0.5 mm<Td<3.2 mm. Therefore, it is favorable for keeping the image capturing lens system compact. Preferably, the following condition is satisfied: 0.8 mm<Td<2.5 mm.

When the axial distance between the object-side surface of the first lens element and the image-side surface of the fourth lens element is Td, and half of a maximal field of view of the image capturing lens system is HFOV, the following condition is satisfied: 1.0 mm<Td/tan(HFOV)<3.75 mm. Therefore, it is favorable for obtaining a large field of view and short total track length for the image capturing lens system. Preferably, the following condition is satisfied: 1.2 mm<Td/tan(HFOV)<2.75 mm.

When a focal length of the image capturing lens system is f, and a focal length of the fourth lens element is f4, the following condition is satisfied: |f/f4|<1.20. Therefore, it is favorable for the principal point of the image capturing lens system being positioned away from the image plane so as to reduce the total track length and keep the image capturing lens system compact.

When a focal length of the second lens element is f2, and a focal length of the third lens element is f3, the following condition is satisfied: f2/f3<−0.65. Therefore, it is favorable for balancing the refractive powers of the second lens element and the third lens element so as to correct the aberration and reduce the photosensitivity. Preferably, the following condition is satisfied: f2/f3<−0.75.

When the focal length of the image capturing lens system is f, and the focal length of the third lens element is f3, the following condition is satisfied: −2.0<f/f3<−0.95. Therefore, the third lens element serves as a correcting lens for balancing and correcting the aberrations of the image capturing lens system so as to obtain better image quality.

When an f-number of the image capturing lens system is Fno, and the following condition is satisfied: 1.40<Fno≤2.25. Therefore, it is favorable for improving the illumination in a peripheral region of the image capturing lens system.

When the focal length of the image capturing lens system is f, and a focal length of the first lens element is f1, the following condition is satisfied: −0.25<f/f1<0.75. Therefore, the first lens element will have a more proper refractive power so as to avoid excess photosensitivity. Preferably, the following condition is satisfied: 0.25<f/f1<0.75.

When a curvature radius of the object-side surface of the second lens element is R3, and a curvature radius of the image-side surface of the second lens element is R4, the following condition is satisfied: 0.5<(R3+R4)/(R3−R4)<2.5. Therefore, it is favorable for further correcting the aberration of the image capturing lens system.

When the focal length of the image capturing lens system is f, and the following condition is satisfied: 0.5 mm<f<2.0 mm. Therefore, it is favorable for providing a proper total track length.

When a sum of the central thicknesses of the first lens element, the second lens element, the third lens element, and the fourth lens element is ΣCT, and the axial distance between the object-side surface of the first lens element and the image-side surface of the fourth lens element is Td, the following condition is satisfied: 0.80<ΣCT/Td<0.95. Therefore, it is favorable for assembling the lens elements of the image capturing lens system so as to reduce the photosensitivity.

When an Abbe number of the first lens element is V1, and the following condition is satisfied: 45<V1. Therefore, it is favorable for correcting the chromatic aberration of the image capturing lens system.

When a central thickness of the second lens element is CT2, a central thickness of the first lens element is CT1, a central thickness of the third lens element is CT3, and a central thickness of the fourth lens element is CT4, the following condition is satisfied: 0.65<CT2/(CT1+CT3+CT4)<2.0. Therefore, the thickness of each lens element is favorable for manufacturing and assembling the lens elements.

When a maximal field of view of the image capturing lens system is FOV, and the following condition is satisfied: 80 degrees<FOV<110 degrees. Therefore, it is favorable for obtaining enough field of view.

According to the image capturing lens system of the present disclosure, the lens elements thereof can be made of glass or plastic material. When the lens elements are made of glass material, the distribution of the refractive power of the image capturing lens system may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the image capturing lens system can also be reduced.

According to the image capturing lens system of the present disclosure, each of an object-side surface in a paraxial region thereof and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the image capturing lens system of the present disclosure, the image capturing lens system can include at least one stop, such as an aperture stop, a glare stop or a field stop. Said glare stop or said field stop is for eliminating the stray light and thereby improving the image resolution thereof.

According to the image capturing lens system of the present disclosure, an aperture stop can be configured as a front stop or a middle stop. A front stop disposed between an imaged object and the first lens element can provide a longer distance between an exit pupil of the image capturing lens system and the image plane and thereby improves the image-sensing efficiency of an image sensor. A middle stop disposed between the first lens element and the image plane is favorable for enlarging the field of view of the image capturing lens system and thereby provides a wider field of view for the same.

The present image capturing lens system can be optionally applied to moving focus optical systems. According to the image capturing lens system of the present disclosure, the image capturing lens system is featured with good correction ability and high image quality, and can be applied to 3D (three-dimensional) image capturing applications, in products such as digital cameras, mobile devices, digital tablets, wearable devices and other mobile terminals.

According to the present disclosure, an imaging device is provided. The imaging device includes the image capturing lens system according to the aforementioned image capturing lens system of the present disclosure, and an image sensor, wherein the image sensor is disposed on an image plane of the aforementioned image capturing lens system. As a result, it is favorable for reducing the total track length of the image capturing lens system while obtaining large field of view. Furthermore, it is also favorable for improving the resolving power and illumination so as to achieve the best image quality. Preferably, the imaging device can further include a barrel member, a holding member or a combination thereof.

According to the present disclosure, a mobile terminal is provided, wherein the mobile terminal includes the aforementioned imaging device. The imaging device includes the image capturing lens system according to the aforementioned image capturing lens system of the present disclosure, and the image sensor, wherein the image sensor is disposed on an image plane of the aforementioned image capturing lens system. As a result, it is favorable for reducing the total track length of the image capturing lens system while obtaining large field of view. Furthermore, it is also favorable for improving the resolving power and illumination so as to achieve the best image quality.

Figure 11B:
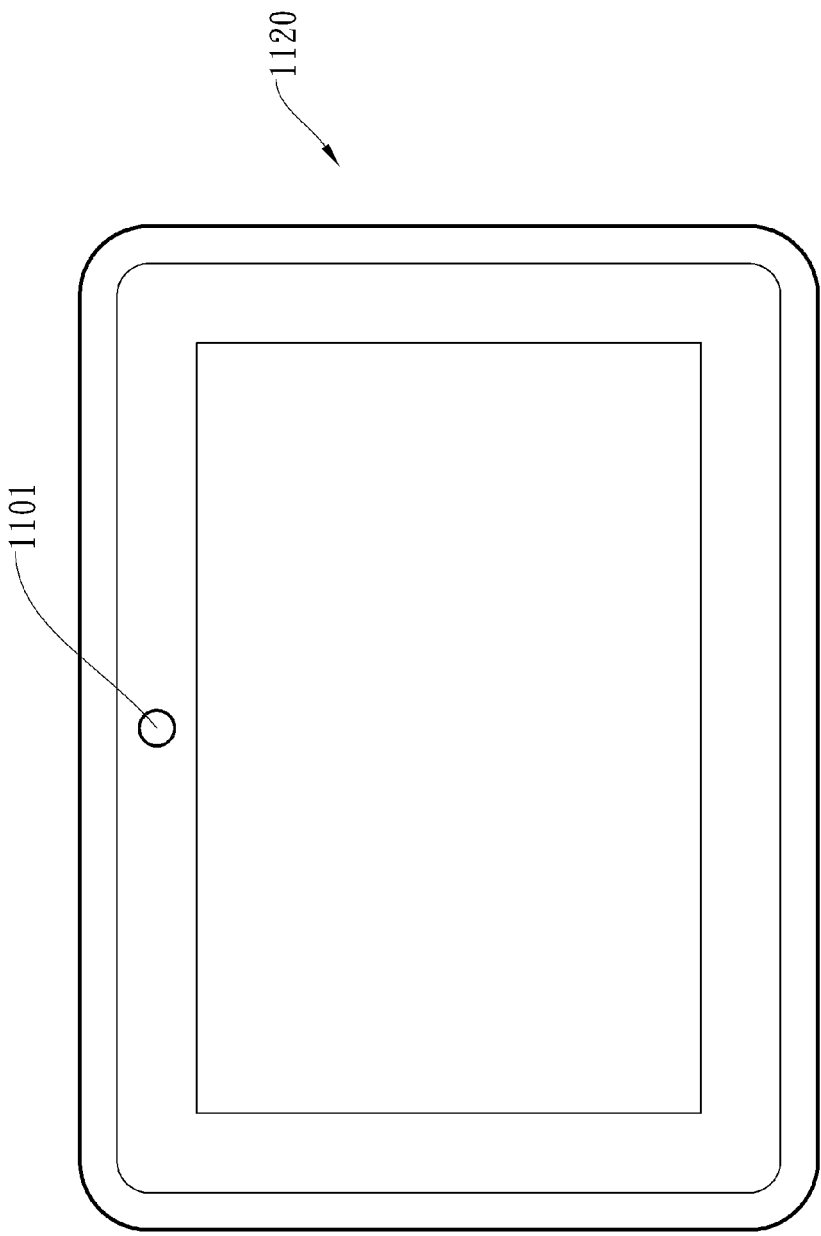
FIG. 11B shows a tablet personal computer with an imaging device of the present disclosure installed therein.
Figure 11C:
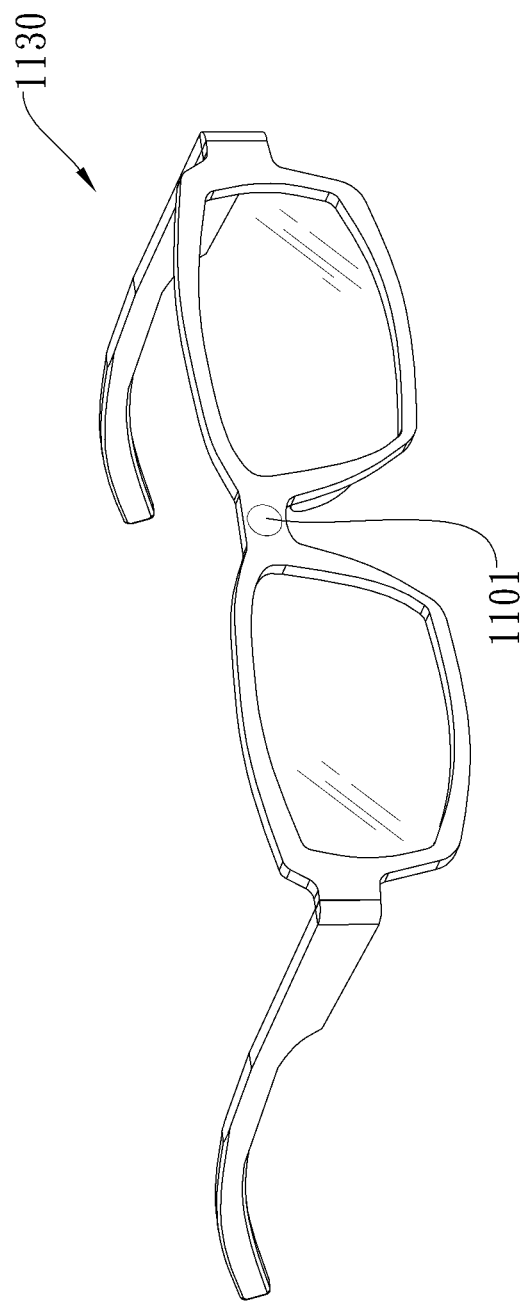
FIG. 11C shows a wearable device with an imaging device of the present disclosure installed therein.

In FIG. 11A, FIG. 11B and FIG. 11C, an imaging device 1101 may be installed in but not limited to a mobile terminal, including a smart phone 1110, a tablet personal computer 1120 or a wearable device 1130. The three exemplary figures of different kinds of mobile terminal are only exemplary for showing the imaging device of present disclosure installing in a mobile terminal and is not limited thereto. Preferably, the mobile terminal can further include but not limited to display, control unit, random access memory unit (RAM) a read only memory unit (ROM) or a combination thereof.

According to the above description of the present disclosure, the following 1st-10th specific embodiments are provided for further explanation.

1st Embodiment

Figure 1B:
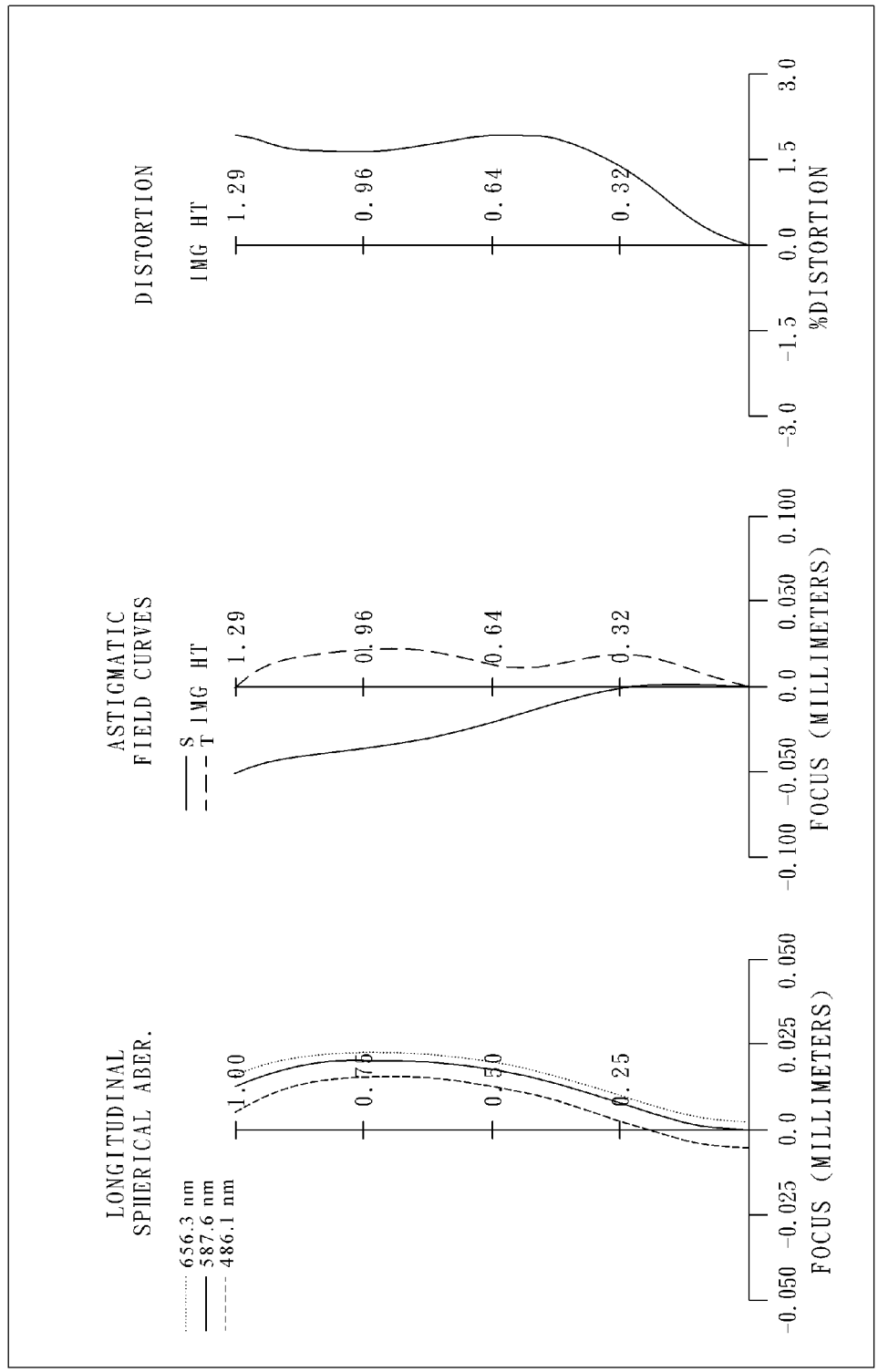
FIG. 1B shows spherical aberration curves, astigmatic field curves and a distortion curve of the imaging device according to the 1st embodiment.

FIG. 1A is a schematic view of an imaging device according to the 1st embodiment of the present disclosure. FIG. 1B shows, in order from left to right, spherical aberration curves, astigmatic field curves and a distortion curve of the imaging device according to the 1st embodiment.

In FIG. 1A, the imaging device includes the image capturing lens system (not otherwise herein labeled) of the present disclosure and an image sensor 170. The image capturing lens system includes, in order from an object side to an image side, a first lens element 110, an aperture stop 100, a second lens element 120, a third lens element 130, a fourth lens element 140, an IR-cut filter 150 and an image plane 160, wherein the image capturing lens system has a total of four lens elements (110-140) with refractive power.

The first lens element 110 with positive refractive power has a convex object-side surface 111 in a paraxial region thereof and a concave image-side surface 112 in a paraxial region thereof, which are both aspheric, and the first lens element 110 is made of plastic material.

The second lens element 120 with positive refractive power has a convex object-side surface 121 in a paraxial region thereof and a convex image-side surface 122 in a paraxial region thereof, which are both aspheric, and the second lens element 120 is made of plastic material.

The third lens element 130 with negative refractive power has a concave object-side surface 131 in a paraxial region thereof and a convex image-side surface 132 in a paraxial region thereof, which are both aspheric, and the third lens element 130 is made of plastic material.

The fourth lens element 140 with positive refractive power has a convex object-side surface 141 in a paraxial region thereof and a concave image-side surface 142 in a paraxial region thereof, which are both aspheric, and the fourth lens element 140 is made of plastic material. Furthermore, the image-side surface 142 of the fourth lens element 140 has at least one convex shape in an off-axis region thereof.

The IR-cut filter 150 is made of glass and located between the fourth lens element 140 and the image plane 160, and will not affect the focal length of the image capturing lens system. The image sensor 170 is disposed on the image plane 160 of the image capturing lens system.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the image capturing lens system of the imaging device according to the 1st embodiment, when a focal length of the image capturing lens system is f, an f-number of the image capturing lens system is Fno, and half of a maximal field of view of the image capturing lens system is HFOV, these parameters have the following values: f=1.17 mm; Fno=2.20; and HFOV=46.7 degrees.

In the image capturing lens system of the imaging device according to the 1st embodiment, when an Abbe number of the first lens element 110 is V1, the following condition is satisfied: V1=21.4.

In the image capturing lens system according to the 1st embodiment, when a central thickness of the second lens element 120 is CT2, a central thickness of the first lens element 110 is CT1, a central thickness of the third lens element 130 is CT3, and a central thickness of the fourth lens element 140 is CT4, the following condition is satisfied: CT2/(CT1+CT3+CT4)=0.69.

In the image capturing lens system according to the 1st embodiment, when a curvature radius of the object-side surface 121 of the second lens element 120 is R3, and a curvature radius of the image-side surface 122 of the second lens element 120 is R4, the following condition is satisfied: (R3+R4)/(R3−R4)=0.85.

In the image capturing lens system of the imaging device according to the 1st embodiment, when the focal length of the image capturing lens system is f, and a focal length of the first lens element 110 is f1, the following condition is satisfied: f/f1=0.12.

In the image capturing lens system of the imaging device according to the 1st embodiment, when a focal length of the second lens element 120 is f2, and a focal length of the third lens element 130 is f3, the following condition is satisfied: f2/f3=−0.77.

In the image capturing lens system of the imaging device according to the 1st embodiment, when the focal length of the image capturing lens system is f, and a focal length of the fourth lens element 140 is f4, the following condition is satisfied: |f/f4|=0.77.

In the image capturing lens system of the imaging device according to the 1st embodiment, when the focal length of the image capturing lens system is f, and the focal length of the third lens element 130 is f3, the following condition is satisfied: f/f3=−1.10.

In the image capturing lens system according to the 1st embodiment, when an axial distance between the object-side surface 111 of the first lens element 110 and the image-side surface 142 of the fourth lens element 140 is Td, the following condition is satisfied: Td=1.850 mm.

In the image capturing lens system according to the 1st embodiment, when a sum of the central thicknesses of the first lens element 110, the second lens element 120, the third lens element 130, and the fourth lens element 140 is ΣCT, and the axial distance between the object-side surface 111 of the first lens element 110 and the image-side surface 142 of the fourth lens element 140 is Td, the following condition is satisfied: ΣCT/Td=0.89.

In the image capturing lens system according to the 1st embodiment, when the axial distance between the object-side surface 111 of the first lens element 110 and the image-side surface 142 of the fourth lens element 140 is Td, and half of the maximal field of view of the image capturing lens system is HFOV, the following condition is satisfied: Td/tan(HFOV)=1.74 mm.

In the image capturing lens system of the imaging device according to the 1st embodiment, when a maximal field of view of the image capturing lens system is FOV, the following condition is satisfied: FOV=93.4 degrees.

The detailed optical data of the 1st embodiment are shown in Table 1 and the aspheric surface data are shown in Table 2 below.

TABLE 1

Embodiment 1
f = 1.17 mm, Fno = 2.20, HFOV = 46.7 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.666 | ASP | 0.256 | Plastic | 1.650 | 21.4 | 9.56 |
| 2 | | 2.139 | ASP | 0.031 | | | | |
| 3 | Ape. Stop | Plano | | 0.019 | | | | |
| 4 | Lens 2 | 5.712 | ASP | 0.671 | Plastic | 1.544 | 55.9 | 0.82 |
| 5 | | −0.464 | ASP | 0.130 | | | | |
| 6 | Lens 3 | −0.228 | ASP | 0.230 | Plastic | 1.634 | 23.8 | −1.06 |
| 7 | | −0.480 | ASP | 0.030 | | | | |
| 8 | Lens 4 | 0.679 | ASP | 0.483 | Plastic | 1.535 | 55.7 | 1.52 |
| 9 | | 3.062 | ASP | 0.300 | | | | |
| 10 | IR-cut filter | Plano | | 0.145 | Glass | 1.517 | 64.2 | — |
| 11 | | Plano | | 0.204 | | | | |
| 12 | Image | Plano | | — | | | | |

Note:
Reference wavelength is 587.6 nm (d-line).

TABLE 2

Aspheric Coefficients

| Surface # | 1 | 2 | 4 | 5 |
|---|---|---|---|---|
| k = | 1.2237E+00 | 1.7244E+01 | 9.0000E+01 | −6.9311E−01 |
| A4 = | 3.1416E−01 | 1.1703E+00 | −4.1498E−01 | −6.9345E−01 |
| A6 = | −1.0010E+00 | −2.0080E+01 | 3.6416E+00 | 1.3202E+00 |
| A8 = | 4.5872E+01 | 5.2569E+02 | 4.3035E+01 | 1.0955E+01 |
| A10 = | −5.9339E+02 | −3.0044E+03 | −7.4996E+03 | −3.8285E+02 |
| A12 = | 4.0961E+03 | −1.6432E+05 | 1.3290E+05 | 3.0040E+03 |
| A14 = | −1.4631E+04 | 3.1882E+06 | −1.1481E+06 | −1.0680E+04 |
| A16 = | 2.0715E+04 | −1.7563E+07 | 3.7732E+06 | 1.3826E+04 |

| Surface # | 6 | 7 | 8 | 9 |
|---|---|---|---|---|
| k = | −9.8477E−01 | −3.2669E+00 | −6.1619E−01 | −1.4636E+01 |
| A4 = | 3.5682E+00 | −1.8915E+00 | −1.2870E+00 | 1.2883E+00 |
| A6 = | −3.7958E+00 | 8.7075E+00 | 3.1244E+00 | −3.7603E+00 |
| A8 = | −1.1135E+02 | −3.6761E+01 | −9.1933E+00 | 5.9040E+00 |
| A10 = | 1.5862E+03 | 1.7257E+02 | 1.7146E+01 | −5.8521E+00 |
| A12 = | −8.7685E+03 | −4.8146E+02 | −1.9850E+01 | 3.5356E+00 |
| A14 = | 2.3054E+04 | 6.7728E+02 | 1.2752E+01 | −1.1759E+00 |
| A16 = | −2.3557E+04 | −3.6747E+02 | −3.5165E+00 | 1.6169E−01 |

In Table 1, the curvature radius, the thickness and the focal length are shown in millimeters (mm). Surface numbers 0-12 represent the surfaces sequentially arranged from the object-side to the image-side along the optical axis. In Table 2, k represents the conic coefficient of the equation of the aspheric surface profiles. A1-A16 represent the aspheric coefficients ranging from the 1st order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 2A:
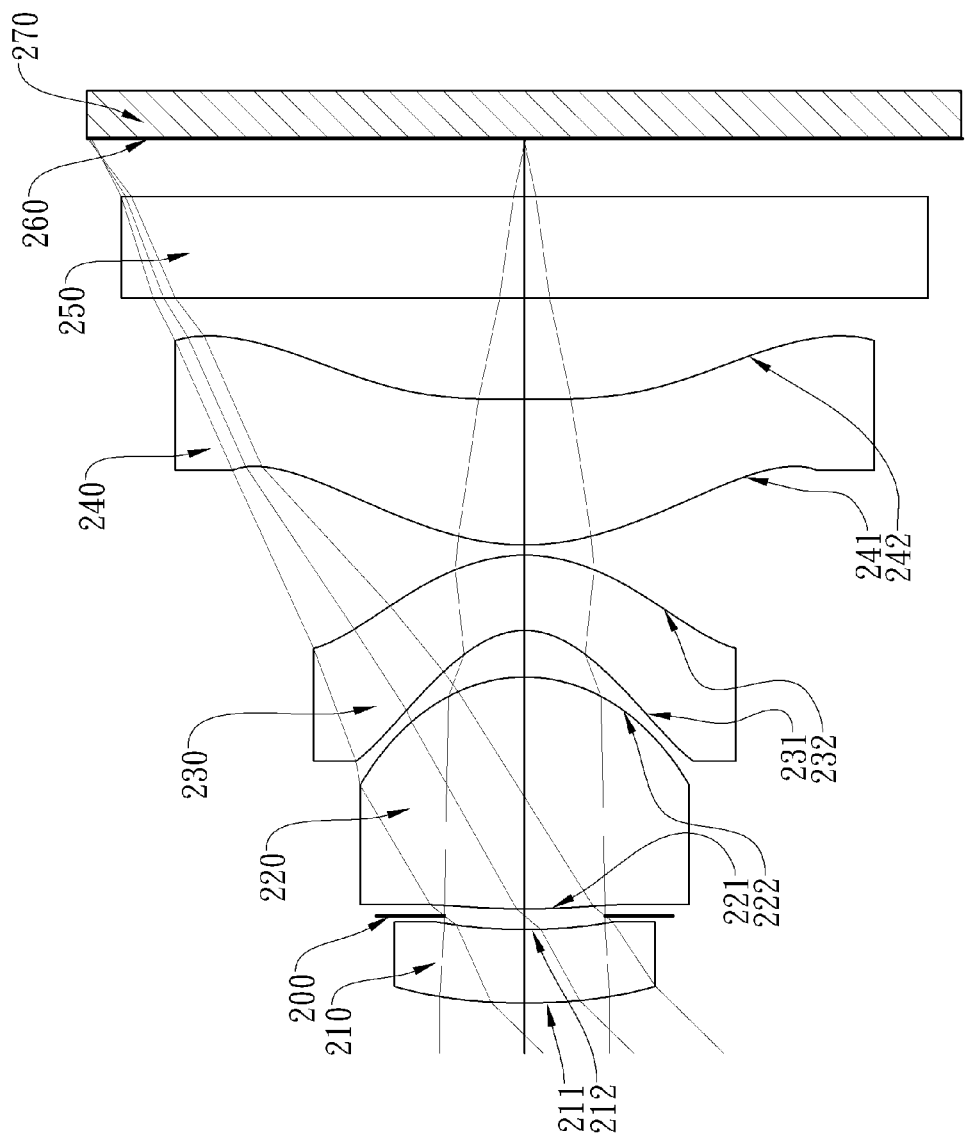
FIG. 2A is a schematic view of an imaging device according to the 2nd embodiment of the present disclosure.
Figure 2B:
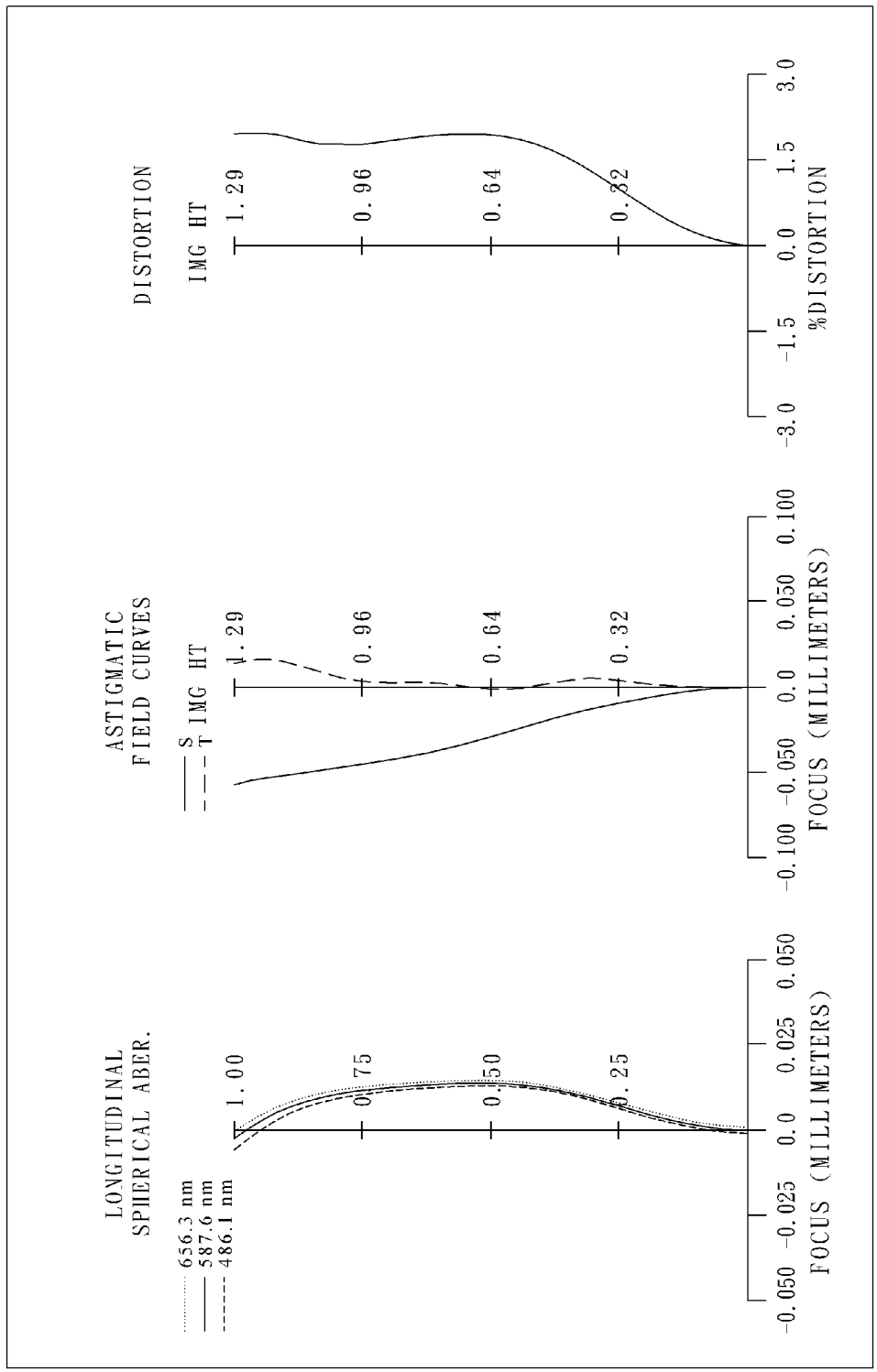
FIG. 2B shows spherical aberration curves, astigmatic field curves and a distortion curve of the imaging device according to the 2nd embodiment.

FIG. 2A is a schematic view of an imaging device according to the 2nd embodiment of the present disclosure. FIG. 2B shows, in order from left to right, spherical aberration curves, astigmatic field curves and a distortion curve of the imaging device according to the 2nd embodiment.

In FIG. 2A, the imaging device includes the image capturing lens system (not otherwise herein labeled) of the present disclosure and an image sensor 270. The image capturing lens system includes, in order from an object side to an image side, a first lens element 210, an aperture stop 200, a second lens element 220, a third lens element 230, a fourth lens element 240, an IR-cut filter 250 and an image plane 260, wherein the image capturing lens system has a total of four lens elements (210-240) with refractive power.

The first lens element 210 with positive refractive power has a convex object-side surface 211 in a paraxial region thereof and a concave image-side surface 212 in a paraxial region thereof, which are both aspheric, and the first lens element 210 is made of plastic material.

The second lens element 220 with positive refractive power has a convex object-side surface 221 in a paraxial region thereof and a convex image-side surface 222 in a paraxial region thereof, which are both aspheric, and the second lens element 220 is made of plastic material.

The third lens element 230 with negative refractive power has a concave object-side surface 231 in a paraxial region thereof and a convex image-side surface 232 in a paraxial region thereof, which are both aspheric, and the third lens element 230 is made of plastic material.

The fourth lens element 240 with positive refractive power has a convex object-side surface 241 in a paraxial region thereof and a concave image-side surface 242 in a paraxial region thereof, which are both aspheric, and the fourth lens element 240 is made of plastic material. Furthermore, the image-side surface 242 of the fourth lens element 240 has at least one convex shape in an off-axis region thereof.

The IR-cut filter 250 is made of glass and located between the fourth lens element 240 and the image plane 260, and will not affect the focal length of the image capturing lens system. The image sensor 270 is disposed on the image plane 260 of the image capturing lens system.

The detailed optical data of the 2nd embodiment are shown in Table 3 and the aspheric surface data are shown in Table 4 below.

TABLE 3

Embodiment 2
f = 1.23 mm, Fno = 2.45, HFOV = 45.6 deg.

| Surface # |  | Curvature Radius |  | Thickness | Material | Index | Abbe # | Focal Length |
|---|---|---|---|---|---|---|---|---|
| 0 | Object | Plano |  | Infinity |  |  |  |  |
| 1 | Lens 1 | 1.728 | ASP | 0.217 | Plastic | 1.640 | 22.0 | 1207.16 |
| 2 |  | 1.647 | ASP | 0.041 |  |  |  |  |
| 3 | Ape. Stop | Plano |  | 0.020 |  |  |  |  |
| 4 | Lens 2 | 2.201 | ASP | 0.685 | Plastic | 1.544 | 55.9 | 0.78 |
| 5 |  | −0.465 | ASP | 0.138 |  |  |  |  |
| 6 | Lens 3 | −0.213 | ASP | 0.222 | Plastic | 1.634 | 23.8 | −0.90 |
| 7 |  | −0.479 | ASP | 0.030 |  |  |  |  |
| 8 | Lens 4 | 0.691 | ASP | 0.430 | Plastic | 1.535 | 55.7 | 1.40 |
| 9 |  | 7.112 | ASP | 0.300 |  |  |  |  |
| 10 | IR-cut filter | Plano |  | 0.300 | Glass | 1.517 | 64.2 | — |
| 11 |  | Plano |  | 0.171 |  |  |  |  |
| 12 | Image | Plano |  | — |  |  |  |  |

Note:
Reference wavelength is 587.6 nm (d-line).

TABLE 4

Aspheric Coefficients

| Surface # | 1 | 2 | 4 | 5 |
|---|---|---|---|---|
| k = | −7.8611E−01 | 2.2256E+01 | 4.4287E+01 | −6.8249E−01 |
| A4 = | 2.7433E−01 | 3.5449E−01 | −1.1581E+00 | −5.9944E−01 |
| A6 = | −1.5466E+00 | −2.9377E+01 | 8.9406E−01 | 3.6061E−01 |
| A8 = | 4.7455E+01 | 6.4129E+02 | 4.1870E+01 | 1.6896E+01 |
| A10 = | −6.0092E+02 | −3.8207E+03 | −7.3180E+03 | −3.8194E+02 |
| A12 = | 4.0961E+03 | −1.6432E+05 | 1.3290E+05 | 3.0043E+03 |
| A14 = | −1.4631E+04 | 3.1882E+06 | −1.1481E+06 | −1.0680E+04 |
| A16 = | 2.0715E+04 | −1.7563E+07 | 3.7732E+06 | 1.3826E+04 |

| Surface # | 6 | 7 | 8 | 9 |
|---|---|---|---|---|
| k = | −1.0107E+00 | −3.0532E+00 | −7.4231E−01 | 2.2155E+01 |
| A4 = | 3.8803E+00 | −1.7079E+00 | −1.1152E+00 | 1.6267E+00 |
| A6 = | −4.2860E+00 | 8.7245E+00 | 2.9613E+00 | −4.5228E+00 |
| A8 = | −1.1314E+02 | −3.7291E+01 | −9.2058E+00 | 6.4630E+00 |
| A10 = | 1.5859E+03 | 1.7181E+02 | 1.7048E+01 | −5.8730E+00 |
| A12 = | −8.7686E+03 | −4.8143E+02 | −1.9563E+01 | 3.4083E+00 |
| A14 = | 2.3054E+04 | 6.7878E+02 | 1.3110E+01 | −1.1920E+00 |
| A16 = | −2.3557E+04 | −3.6776E+02 | −4.1607E+00 | 1.9105E−01 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd Embodiment | | | |
|---|---|---|---|
| f [mm] | 1.23 | f2/f3 | −0.87 |
| Fno | 2.45 | |f/f4| | 0.88 |
| HFOV [deg.] | 45.6 | f/f3 | −1.37 |
| V1 | 22.0 | Td [mm] | 1.783 |
| CT2/(CT1 + CT3 + CT4) | 0.79 | ΣCT/Td | 0.87 |
| (R3 + R4)/(R3 − R4) | 0.65 | Td/tan(HFOV) [mm] | 1.75 |
| f/f1 | 0.00 | FOV [deg.] | 91.2 |

3rd Embodiment

Figure 3A:
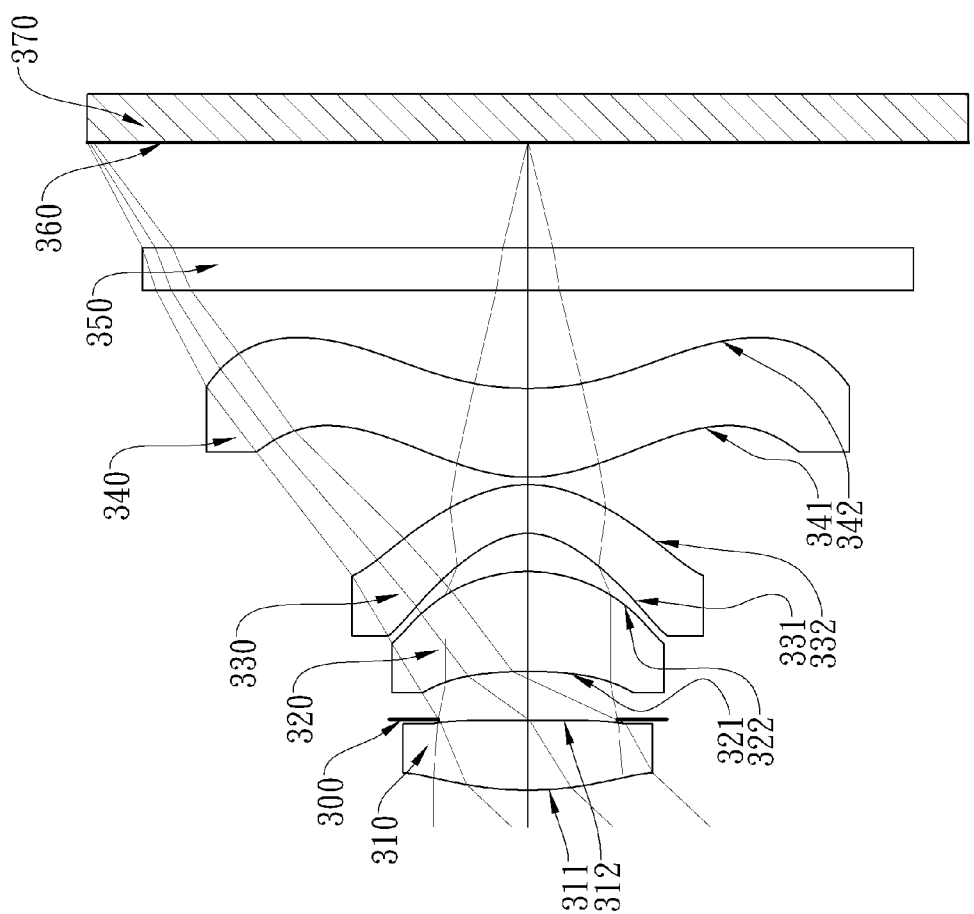
FIG. 3A is a schematic view of an imaging device according to the 3rd embodiment of the present disclosure.
Figure 3B:
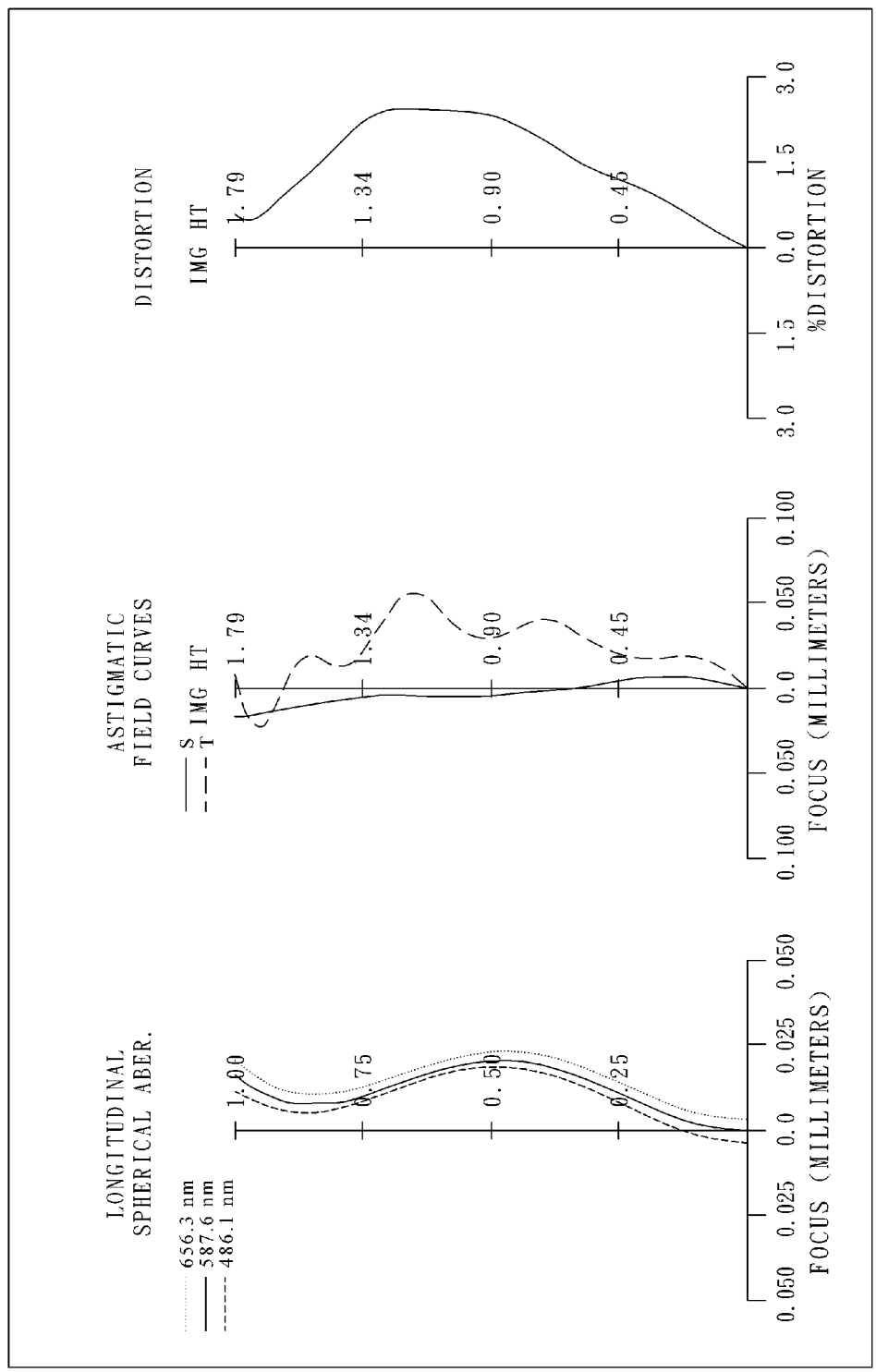
FIG. 3B shows spherical aberration curves, astigmatic field curves and a distortion curve of the imaging device according to the 3rd embodiment.

FIG. 3A is a schematic view of an imaging device according to the 3rd embodiment of the present disclosure. FIG. 3B shows, in order from left to right, spherical aberration curves, astigmatic field curves and a distortion curve of the imaging device according to the 3rd embodiment.

In FIG. 3A, the imaging device includes the image capturing lens system (not otherwise herein labeled) of the present disclosure and an image sensor 370. The image capturing lens system includes, in order from an object side to an image side, a first lens element 310, an aperture stop 300, a second lens element 320, a third lens element 330, a fourth lens element 340, an IR-cut filter 350 and an image plane 360, wherein the image capturing lens system has a total of four lens elements (310-340) with refractive power.

The first lens element 310 with positive refractive power has a convex object-side surface 311 in a paraxial region thereof and a concave image-side surface 312 in a paraxial region thereof, which are both aspheric, and the first lens element 310 is made of plastic material.

The second lens element 320 with positive refractive power has a concave object-side surface 321 in a paraxial region thereof and a convex image-side surface 322 in a paraxial region thereof, which are both aspheric, and the second lens element 320 is made of plastic material.

The third lens element 330 with negative refractive power has a concave object-side surface 331 in a paraxial region thereof and a convex image-side surface 332 in a paraxial region thereof, which are both aspheric, and the third lens element 330 is made of plastic material.

The fourth lens element 340 with positive refractive power has a convex object-side surface 341 in a paraxial region thereof and a concave image-side surface 342 in a paraxial region thereof, which are both aspheric, and the fourth lens element 340 is made of plastic material. Furthermore, the image-side surface 342 of the fourth lens element 340 has at least one convex shape in an off-axis region thereof.

The IR-cut filter 350 is made of glass and located between the fourth lens element 340 and the image plane 360, and will not affect the focal length of the image capturing lens system. The image sensor 370 is disposed on the image plane 360 of the image capturing lens system.

The detailed optical data of the 3rd embodiment are shown in Table 5 and the aspheric surface data are shown in Table 6 below.

TABLE 5

Embodiment 3
f = 1.66 mm, Fno = 2.15, HFOV = 46.8 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Lens 1 | 1.333 ASP | 0.286 | Plastic | 1.544 | 55.9 | 2.50 |
| 2 | | 59.851 ASP | 0.005 | | | | |
| 3 | Ape. Stop | Plano | 0.195 | | | | |
| 4 | Lens 2 | −1.920 ASP | 0.409 | Plastic | 1.544 | 55.9 | 1.60 |
| 5 | | −0.644 ASP | 0.156 | | | | |
| 6 | Lens 3 | −0.263 ASP | 0.200 | Plastic | 1.650 | 21.4 | −1.49 |
| 7 | | −0.470 ASP | 0.030 | | | | |
| 8 | Lens 4 | 0.677 ASP | 0.363 | Plastic | 1.535 | 55.7 | 2.33 |
| 9 | | 1.206 ASP | 0.400 | | | | |
| 10 | IR-cut filter | Plano | 0.175 | Glass | 1.517 | 64.2 | — |
| 11 | | Plano | 0.431 | | | | |
| 12 | Image | Plano | — | | | | |

Note:
Reference wavelength is 587.6 nm (d-line).
The effective radius of Surface 1 is 0.510 mm.

TABLE 6

Aspheric Coefficients

| Surface # | 1 | 2 | 4 | 5 |
|---|---|---|---|---|
| k = | −2.4704E+00 | 9.0000E+01 | 5.8947E+00 | −3.7972E−01 |
| A4 = | −3.4848E−02 | −3.8775E−01 | −9.3075E−01 | −3.3741E−01 |
| A6 = | −4.4471E−01 | −2.8417E+00 | 3.6516E+00 | 9.2277E−01 |

TABLE 6-continued

| Aspheric Coefficients | | | | |
|---|---|---|---|---|
| A8 = | −4.9925E−01 | 1.8185E+01 | −4.0769E+01 | −3.9461E+00 |
| A10 = | −1.2166E+01 | −2.0954E+01 | −4.4351E+00 | −1.9037E+01 |
| A12 = | 3.9114E+01 | −1.4998E+03 | 1.2130E+03 | 4.9148E+01 |
| A14 = | −1.7950E+02 | 1.2389E+04 | −4.4615E+03 | 1.0076E+02 |
| A16 = | 3.3572E+02 | −2.9058E+04 | 6.2425E+03 | 8.0489E+01 |
| Surface # | 6 | 7 | 8 | 9 |
| k = | −1.1491E+00 | −2.3808E+00 | −1.7649E+00 | −1.0689E+01 |
| A4 = | 4.2079E+00 | 2.1562E−01 | −6.9591E−01 | 9.1971E−01 |
| A6 = | −2.8310E+01 | −4.4239E+00 | 1.2041E+00 | −3.0958E+00 |
| A8 = | 1.2287E+02 | 1.8790E+01 | −2.9023E+00 | 4.8713E+00 |
| A10 = | −3.9035E+02 | −4.1840E+01 | 4.4195E+00 | −4.6279E+00 |
| A12 = | 8.5064E+02 | 5.5883E+01 | −3.7857E+00 | 2.6418E+00 |
| A14 = | −9.7331E+02 | −4.0255E+01 | 1.6532E+00 | −8.3581E−01 |
| A16 = | 4.7213E+02 | 1.4428E+01 | −2.8192E−01 | 1.1204E−01 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd Embodiment | | | |
|---|---|---|---|
| f [mm] | 1.66 | f2/f3 | −1.07 |
| Fno | 2.15 | |f/f4| | 0.71 |
| HFOV [deg.] | 46.8 | f/f3 | −1.11 |
| V1 | 55.9 | Td [mm] | 1.644 |
| CT2/(CT1 + CT3 + CT4) | 0.48 | ΣCT/Td | 0.77 |
| (R3 + R4)/(R3 − R4) | 2.01 | Td/tan(HFOV) [mm] | 1.54 |
| f/f1 | 0.66 | FOV [deg.] | 93.6 |

4th Embodiment

Figure 4A:
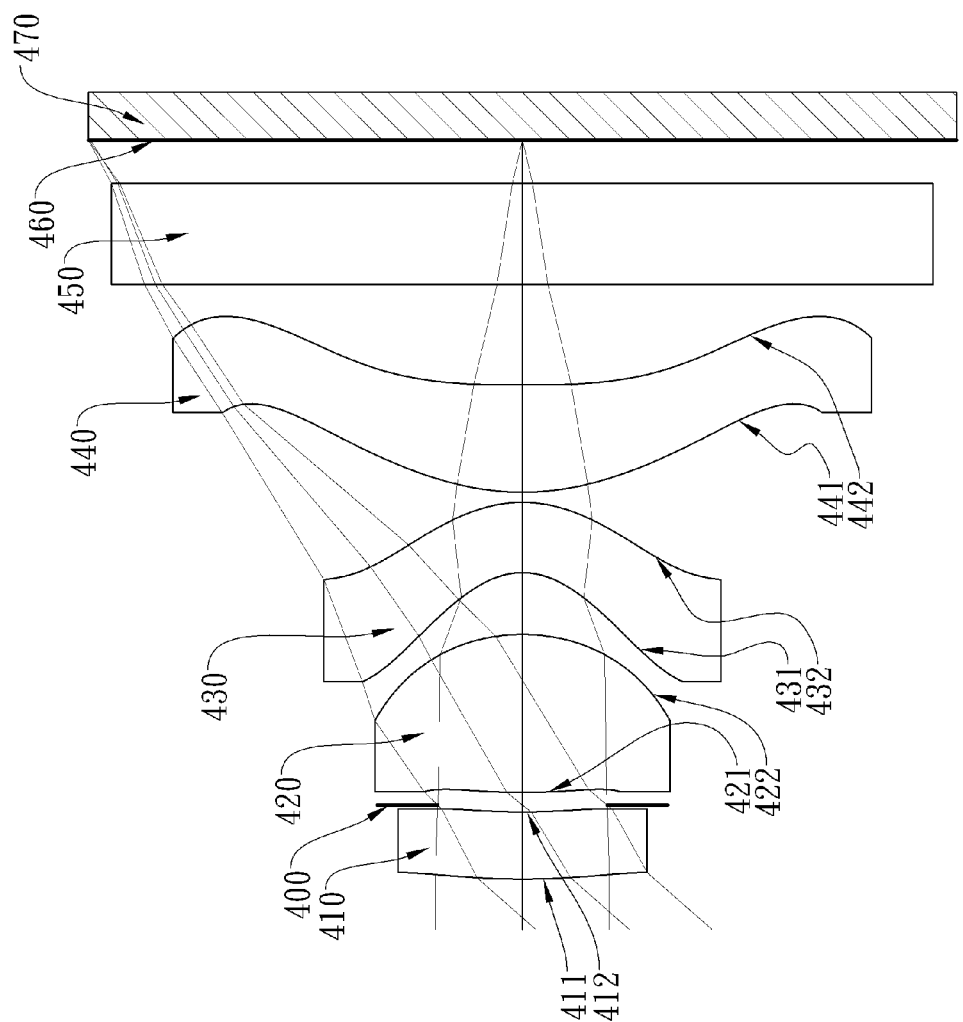
FIG. 4A is a schematic view of an imaging device according to the 4th embodiment of the present disclosure.
Figure 4B:
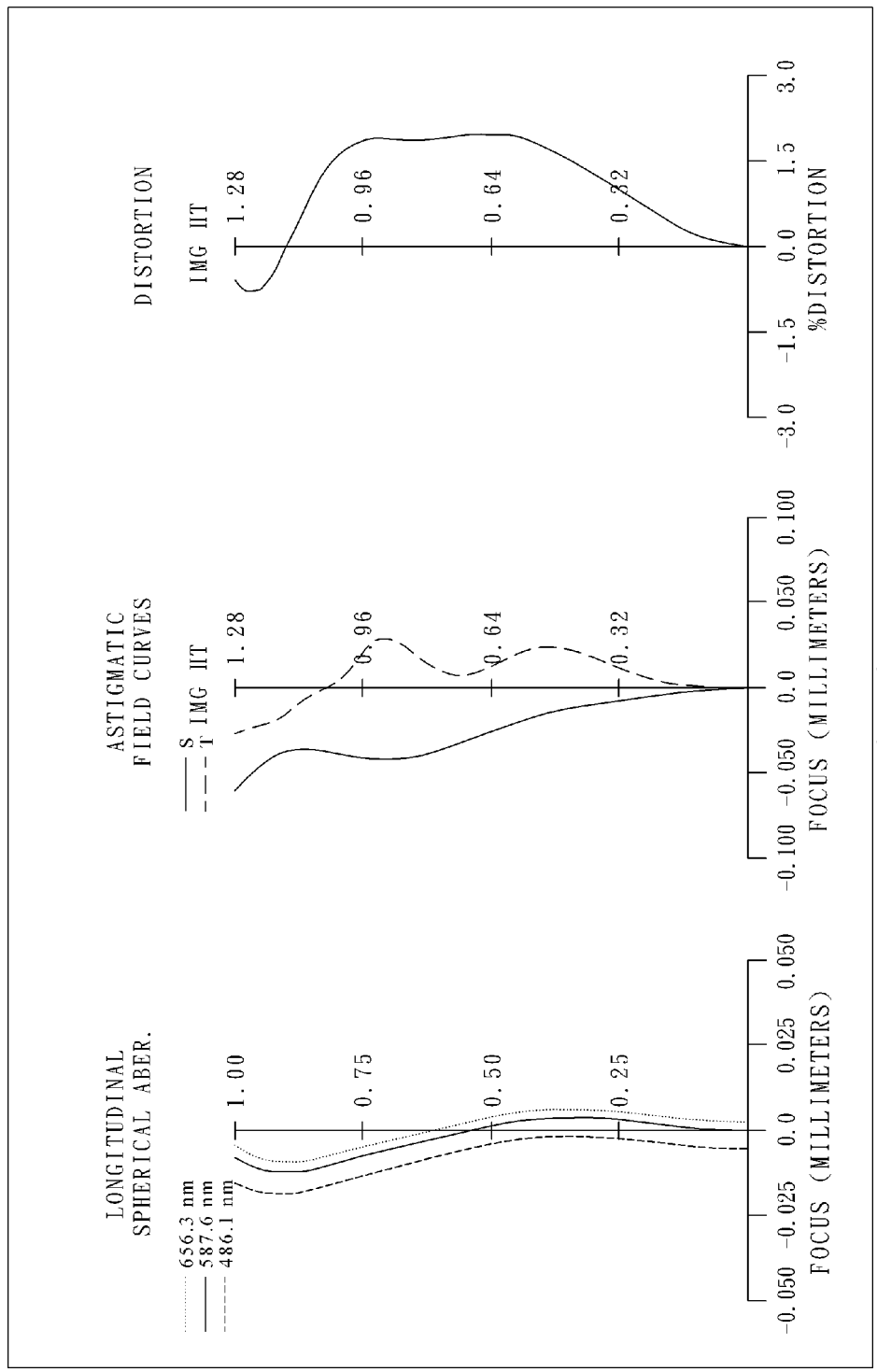
FIG. 4B shows spherical aberration curves, astigmatic field curves and a distortion curve of the imaging device according to the 4th embodiment.

FIG. 4A is a schematic view of an imaging device according to the 4th embodiment of the present disclosure. FIG. 4B shows, in order from left to right, spherical aberration curves, astigmatic field curves and a distortion curve of the imaging device according to the 4th embodiment.

In FIG. 4A, the imaging device includes the image capturing lens system (not otherwise herein labeled) of the present disclosure and an image sensor 470. The image capturing lens system includes, in order from an object side to an image side, a first lens element 410, an aperture stop 400, a second lens element 420, a third lens element 430, a fourth lens element 440, an IR-cut filter 450 and an image plane 460, wherein the image capturing lens system has a total of four lens elements (410-440) with refractive power.

The first lens element 410 with negative refractive power has a convex object-side surface 411 in a paraxial region thereof and a concave image-side surface 412 in a paraxial region thereof, which are both aspheric, and the first lens element 410 is made of plastic material.

The second lens element 420 with positive refractive power has a convex object-side surface 421 in a paraxial region thereof and a convex image-side surface 422 in a paraxial region thereof, which are both aspheric, and the second lens element 420 is made of plastic material.

The third lens element 430 with negative refractive power has a concave object-side surface 431 in a paraxial region thereof and a convex image-side surface 432 in a paraxial region thereof, which are both aspheric, and the third lens element 430 is made of plastic material.

The fourth lens element 440 with positive refractive power has a convex object-side surface 441 in a paraxial region thereof and a concave image-side surface 442 in a paraxial region thereof, which are both aspheric, and the fourth lens element 440 is made of plastic material. Furthermore, the image-side surface 442 of the fourth lens element 440 has at least one convex shape in an off-axis region thereof.

The IR-cut filter 450 is made of glass and located between the fourth lens element 440 and the image plane 460, and will not affect the focal length of the image capturing lens system. The image sensor 470 is disposed on the image plane 460 of the image capturing lens system.

The detailed optical data of the 4th embodiment are shown in Table 7 and the aspheric surface data are shown in Table 8 below.

TABLE 7

Embodiment 4
f = 1.15 mm, Fno = 2.22, HFOV = 48.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.999 | ASP | 0.200 | Plastic | 1.544 | 55.9 | −46.83 |
| 2 | | 1.789 | ASP | 0.021 | | | | |
| 3 | Ape. Stop | Plano | | 0.037 | | | | |
| 4 | Lens 2 | 1.606 | ASP | 0.471 | Plastic | 1.544 | 55.9 | 0.81 |
| 5 | | −0.543 | ASP | 0.184 | | | | |

TABLE 7-continued

Embodiment 4
f = 1.15 mm, Fno = 2.22, HFOV = 48.5 deg.

| Surface # | | Curvature Radius | | Thickness | Material | Index | Abbe # | Focal Length |
|---|---|---|---|---|---|---|---|---|
| 6 | Lens 3 | −0.207 | ASP | 0.209 | Plastic | 1.634 | 23.8 | −1.22 |
| 7 | | −0.393 | ASP | 0.030 | | | | |
| 8 | Lens 4 | 0.747 | ASP | 0.319 | Plastic | 1.535 | 55.7 | 1.62 |
| 9 | | 4.607 | ASP | 0.300 | | | | |
| 10 | IR-cut filter | Plano | | 0.300 | Glass | 1.517 | 64.2 | — |
| 11 | | Plano | | 0.130 | | | | |
| 12 | Image | Plano | | — | | | | |

Note:
Reference wavelength is 587.6 nm (d-line).

TABLE 8

Aspheric Coefficients

| Surface # | 1 | 2 | 4 | 5 |
|---|---|---|---|---|
| k = | −2.2996E+01 | 3.4247E+01 | 9.8701E+00 | −4.2975E−01 |
| A4 = | −2.1353E−01 | −2.0670E+00 | −2.2221E+00 | −6.3795E−01 |
| A6 = | −3.6880E+00 | −3.6063E+01 | −8.7081E+00 | −6.5092E+00 |
| A8 = | 5.2789E+01 | 6.9201E+02 | 1.4888E+02 | 4.6114E+01 |
| A10 = | −6.4083E+02 | −4.8238E+03 | −8.2602E+03 | −4.7532E+02 |
| A12 = | 4.0983E+03 | −1.6432E+05 | 1.3290E+05 | 3.0044E+03 |
| A14 = | −1.4631E+04 | 3.1882E+06 | −1.1481E+06 | −1.0679E+04 |
| A16 = | 2.0715E+04 | −1.7563E+07 | 3.7732E+06 | 1.3828E+04 |

| Surface # | 6 | 7 | 8 | 9 |
|---|---|---|---|---|
| k = | −1.0439E+00 | −2.0056E+00 | −6.4024E−01 | −3.3636E+00 |
| A4 = | 4.2327E+00 | −9.7476E−01 | −8.3147E−01 | 1.0958E+00 |
| A6 = | −3.4551E+00 | 1.0236E+01 | 2.1761E+00 | −1.7086E+00 |
| A8 = | −1.0303E+02 | −3.7610E+01 | −4.8336E+00 | 1.3575E+00 |
| A10 = | 1.5970E+03 | 1.6620E+02 | 5.0397E+00 | −2.6285E+00 |
| A12 = | −8.9315E+03 | −4.9093E+02 | −4.1411E+00 | 4.3863E+00 |
| A14 = | 2.3054E+04 | 6.8046E+02 | 3.4069E+00 | −3.3963E+00 |
| A16 = | −2.3558E+04 | −3.4010E+02 | −1.6576E+00 | 9.5967E−01 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th Embodiment | | | |
|---|---|---|---|
| f [mm] | 1.15 | f2/f3 | −0.66 |
| Fno | 2.22 | |f/f4| | 0.71 |
| HFOV [deg.] | 48.5 | f/f3 | −0.94 |
| V1 | 55.9 | Td [mm] | 1.471 |
| CT2/(CT1 + CT3 + CT4) | 0.65 | ΣCT/Td | 0.82 |
| (R3 + R4)/(R3 − R4) | 0.49 | Td/tan(HFOV) [mm] | 1.30 |
| f/f1 | −0.02 | FOV [deg.] | 97.0 |

5th Embodiment

Figure 5A:
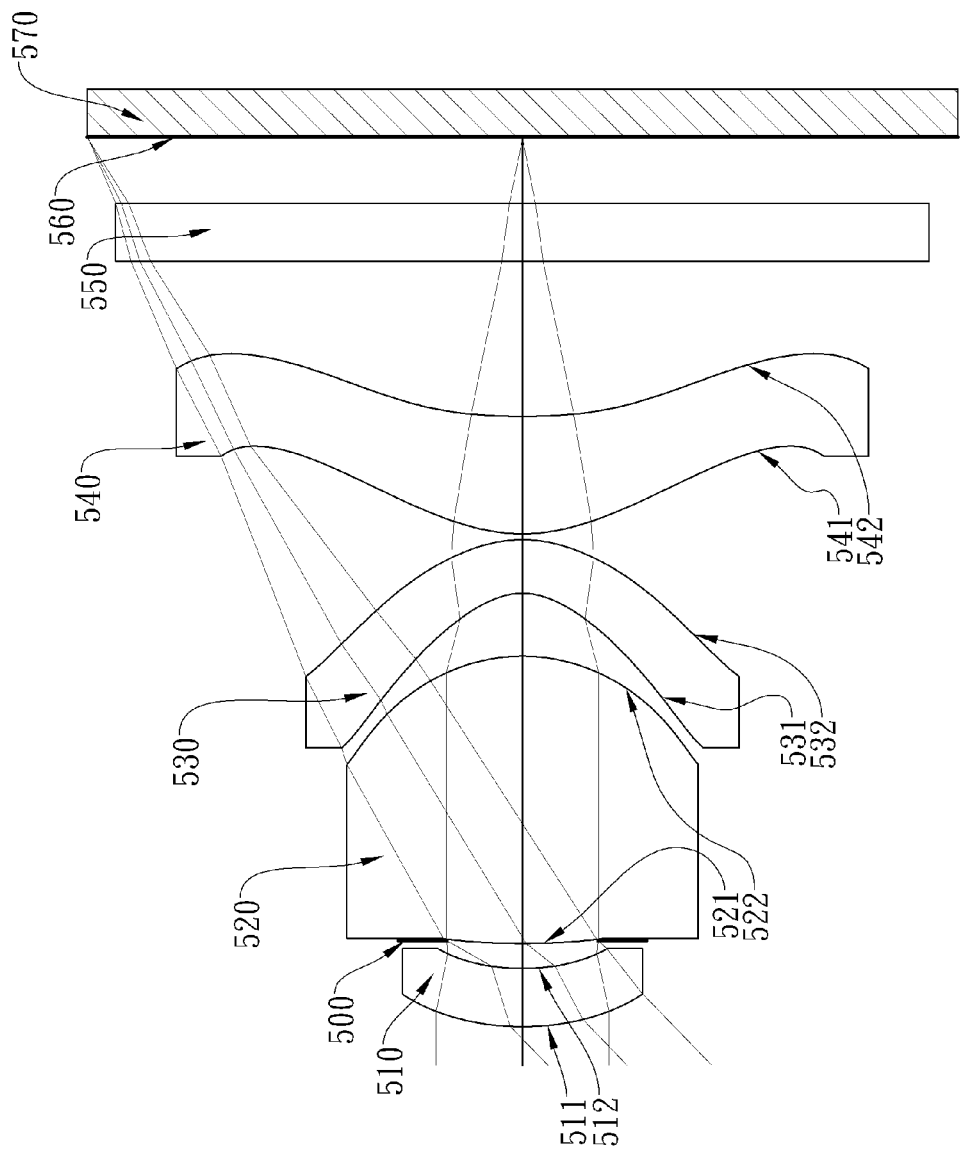
FIG. 5A is a schematic view of an imaging device according to the 5th embodiment of the present disclosure.
Figure 5B:
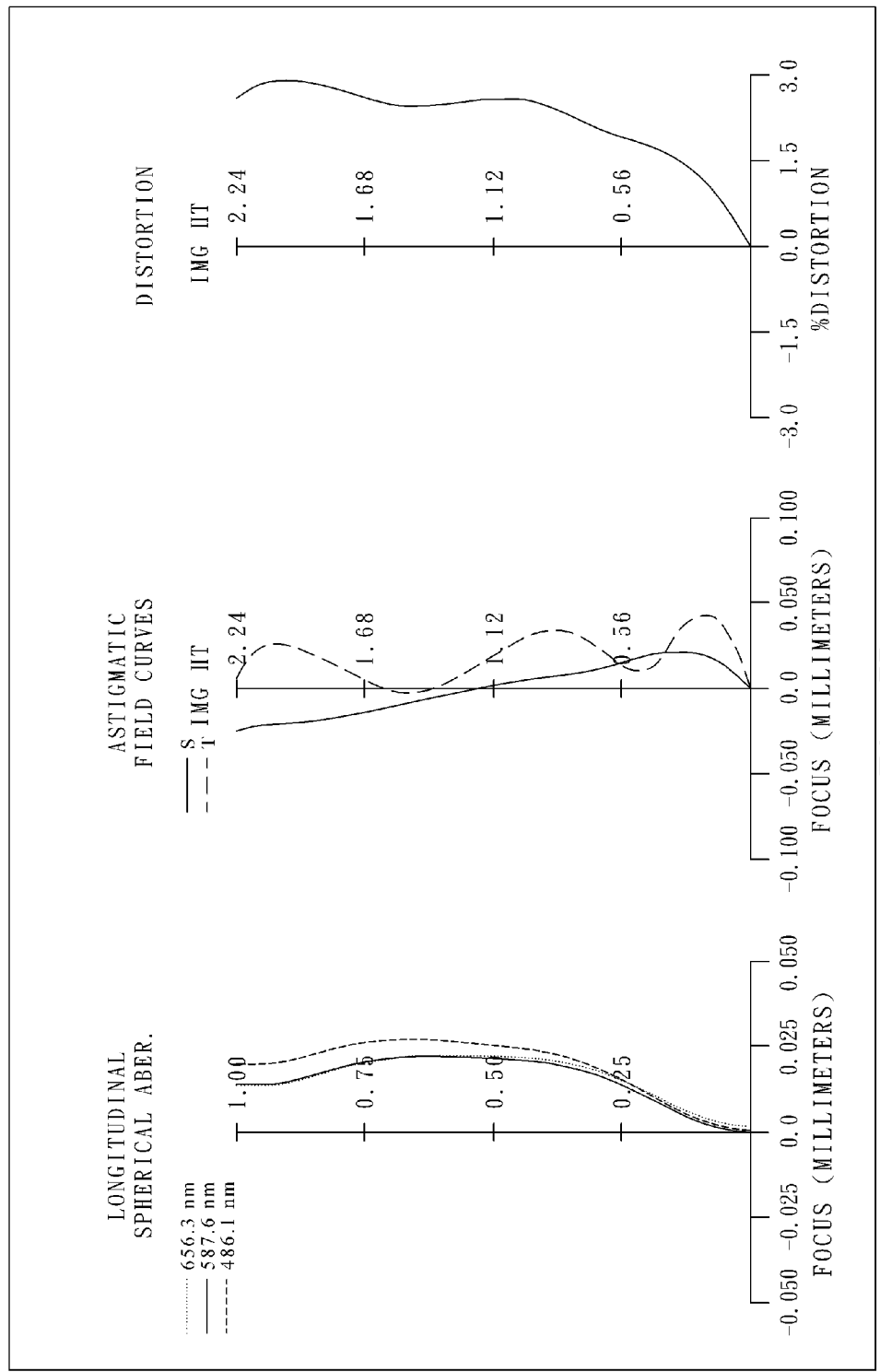
FIG. 5B shows spherical aberration curves, astigmatic field curves and a distortion curve of the imaging device according to the 5th embodiment.

FIG. 5A is a schematic view of an imaging device according to the 5th embodiment of the present disclosure. FIG. 5B shows, in order from left to right, spherical aberration curves, astigmatic field curves and a distortion curve of the imaging device according to the 5th embodiment.

In FIG. 5A, the imaging device includes the image capturing lens system (not otherwise herein labeled) of the present disclosure and an image sensor 570. The image capturing lens system includes, in order from an object side to an image side, a first lens element 510, an aperture stop 500, a second lens element 520, a third lens element 530, a fourth lens element 540, an IR-cut filter 550 and an image plane 560, wherein the image capturing lens system has a total of four lens elements (510-540) with refractive power.

The first lens element 510 with negative refractive power has a convex object-side surface 511 in a paraxial region thereof and a concave image-side surface 512 in a paraxial region thereof, which are both aspheric, and the first lens element 510 is made of glass material.

The second lens element 520 with positive refractive power has a convex object-side surface 521 in a paraxial region thereof and a convex image-side surface 522 in a paraxial region thereof, which are both aspheric, and the second lens element 520 is made of glass material.

The third lens element 530 with negative refractive power has a concave object-side surface 531 in a paraxial region thereof and a convex image-side surface 532 in a paraxial region thereof, which are both aspheric, and the third lens element 530 is made of plastic material.

The fourth lens element 540 with positive refractive power has a convex object-side surface 541 in a paraxial region thereof and a concave image-side surface 542 in a paraxial region thereof, which are both aspheric, and the fourth lens element 540 is made of plastic material. Furthermore, the image-side surface 542 of the fourth lens element 540 has at least one convex shape in an off-axis region thereof.

The IR-cut filter 550 is made of glass and located between the fourth lens element 540 and the image plane 560, and will not affect the focal length of the image capturing lens system. The image sensor 570 is disposed on the image plane 560 of the image capturing lens system.

The detailed optical data of the 5th embodiment are shown in Table 9 and the aspheric surface data are shown in Table 10 below.

TABLE 9

Embodiment 5
f = 2.24 mm, Fno = 2.51, HFOV = 44.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.367 | ASP | 0.300 | Glass | 2.144 | 17.8 | −13.68 |
| 2 | | 1.110 | ASP | 0.144 | | | | |
| 3 | Ape. Stop | Plano | | −0.015 | | | | |
| 4 | Lens 2 | 3.909 | ASP | 1.483 | Glass | 1.525 | 70.3 | 1.60 |
| 5 | | −0.932 | ASP | 0.325 | | | | |
| 6 | Lens 3 | −0.341 | ASP | 0.277 | Plastic | 1.639 | 23.5 | −1.72 |
| 7 | | −0.651 | ASP | 0.030 | | | | |
| 8 | Lens 4 | 0.897 | ASP | 0.606 | Plastic | 1.565 | 57.0 | 2.00 |
| 9 | | 3.302 | ASP | 0.800 | | | | |
| 10 | IR-cut filter | Plano | | 0.300 | Glass | 1.517 | 64.2 | — |
| 11 | | Plano | | 0.342 | | | | |
| 12 | Image | Plano | | — | | | | |

Note:
Reference wavelength is 587.6 nm (d-line).

TABLE 10

Aspheric Coefficients

| Surface # | 1 | 2 | 4 | 5 |
|---|---|---|---|---|
| k = | 1.1992E+00 | 1.9195E+00 | 2.1734E+01 | −7.2786E−01 |
| A4 = | 5.8324E−02 | 1.2422E−01 | −9.9032E−02 | −1.2252E−01 |
| A6 = | −1.4402E−01 | −5.2189E−01 | 5.9983E+00 | 5.2990E−01 |
| A8 = | 1.0028E+00 | 4.2713E+00 | −1.1966E+02 | −3.0301E+00 |
| A10 = | −4.0021E+00 | 1.8016E+01 | 1.4083E+03 | 7.9248E+00 |
| A12 = | 8.9035E+00 | −4.2193E+02 | −9.4428E+03 | −1.0795E+01 |
| A14 = | −9.8479E+00 | 2.2697E+03 | 3.3923E+04 | 6.3429E+00 |
| A16 = | 3.0263E+00 | −4.1004E+03 | −5.0610E+04 | −8.0066E−01 |

| Surface # | 6 | 7 | 8 | 9 |
|---|---|---|---|---|
| k = | −9.8774E−01 | −3.1767E+00 | −8.3817E−01 | −2.4331E+01 |
| A4 = | 2.5606E+00 | −1.2881E−01 | −4.2259E−01 | 3.5717E−01 |
| A6 = | −7.9740E+00 | −6.6170E−01 | 4.3675E−01 | −4.5759E−01 |
| A8 = | 1.4853E+01 | 1.1888E+00 | −4.6275E−01 | 2.9937E−01 |
| A10 = | −1.1480E+01 | −4.2607E−01 | 3.1380E−01 | −1.1921E−01 |
| A12 = | −4.4740E+00 | −5.1720E−01 | −1.2912E−01 | 2.8364E−02 |
| A14 = | 1.2594E+01 | 5.0722E−01 | 2.9275E−02 | −3.7104E−03 |
| A16 = | −5.4160E+00 | −1.2485E−01 | −2.8533E−03 | 2.0238E−04 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th Embodiment | | | |
|---|---|---|---|
| f [mm] | 2.24 | f2/f3 | −0.93 |
| Fno | 2.51 | |f/f4| | 1.12 |
| HFOV [deg.] | 44.2 | f/f3 | −1.30 |
| V1 | 17.8 | Td [mm] | 3.150 |
| CT2/(CT1 + CT3 + CT4) | 1.25 | ΣCT/Td | 0.85 |
| (R3 + R4)/(R3 − R4) | 0.61 | Td/tan(HFOV) [mm] | 3.25 |
| f/f1 | −0.16 | FOV [deg.] | 88.4 |

6th Embodiment

Figure 6A:
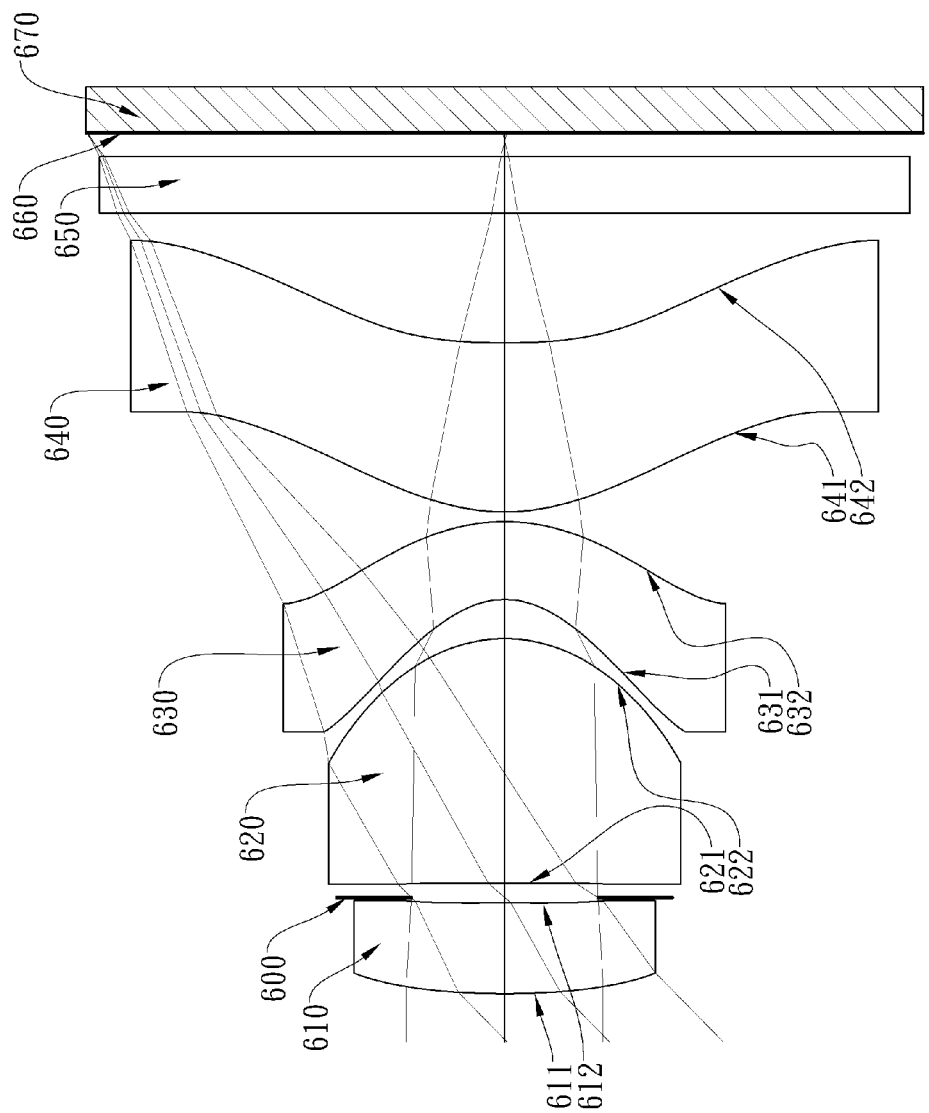
FIG. 6A is a schematic view of an imaging device according to the 6th embodiment of the present disclosure.
Figure 6B:
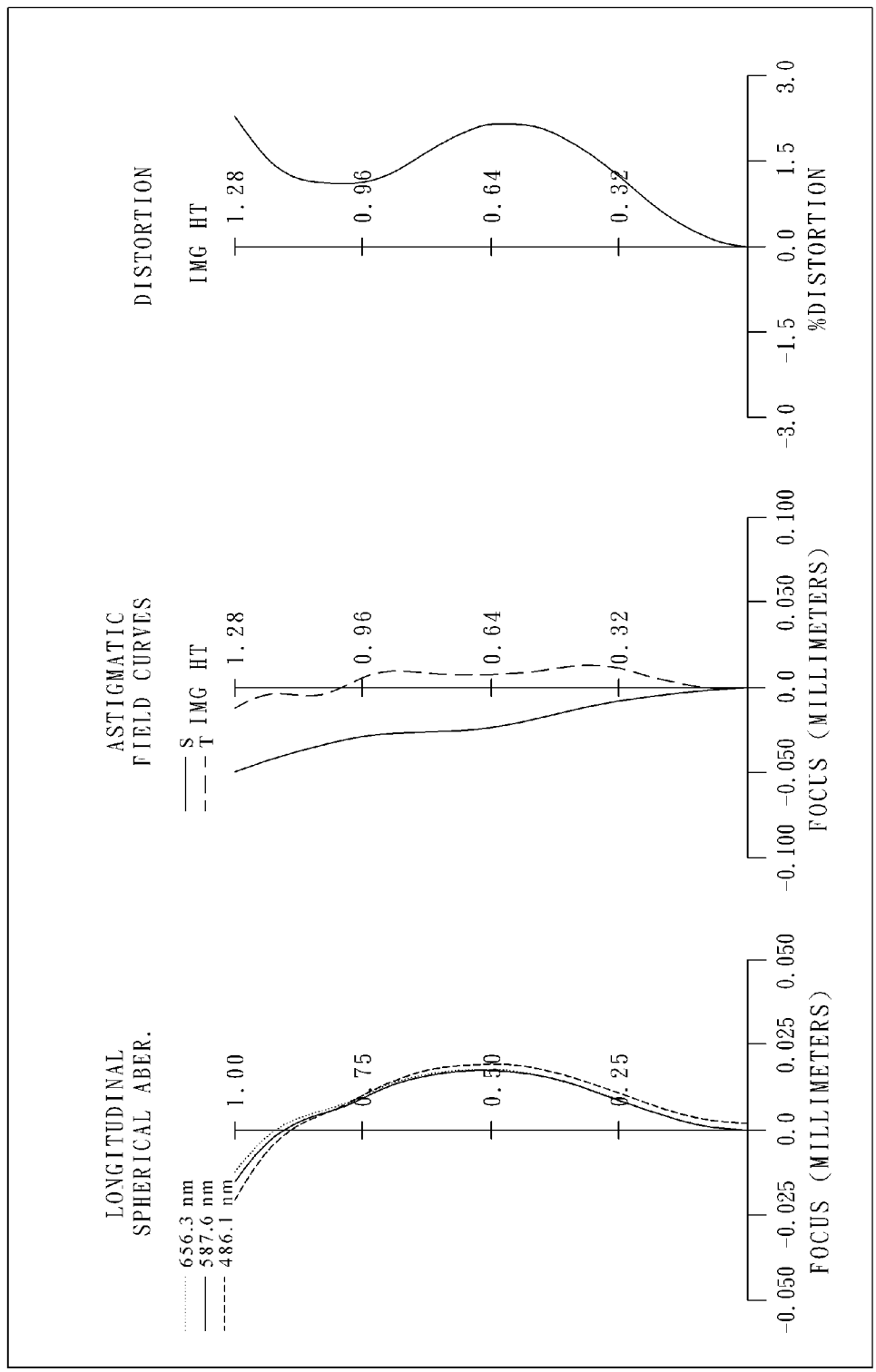
FIG. 6B shows spherical aberration curves, astigmatic field curves and a distortion curve of the imaging device according to the 6th embodiment.

FIG. 6A is a schematic view of an imaging device according to the 6th embodiment of the present disclosure. FIG. 6B shows, in order from left to right, spherical aberration curves, astigmatic field curves and a distortion curve of the imaging device according to the 6th embodiment.

In FIG. 6A, the imaging device includes the image capturing lens system (not otherwise herein labeled) of the present disclosure and an image sensor 670. The image capturing lens system includes, in order from an object side to an image side, a first lens element 610, an aperture stop 600, a second lens element 620, a third lens element 630, a fourth lens element 640, an IR-cut filter 650 and an image plane 660, wherein the image capturing lens system has a total of four lens elements (610-640) with refractive power.

The first lens element 610 with positive refractive power has a convex object-side surface 611 in a paraxial region thereof and a convex image-side surface 612 in a paraxial region thereof, which are both aspheric, and the first lens element 610 is made of plastic material.

The second lens element 620 with positive refractive power has a concave object-side surface 621 in a paraxial region thereof and a convex image-side surface 622 in a paraxial region thereof, which are both aspheric, and the second lens element 620 is made of plastic material.

The third lens element 630 with negative refractive power has a concave object-side surface 631 in a paraxial region thereof and a convex image-side surface 632 in a paraxial region thereof, which are both aspheric, and the third lens element 630 is made of plastic material.

The fourth lens element 640 with positive refractive power has a convex object-side surface 641 in a paraxial region thereof and a concave image-side surface 642 in a paraxial region thereof, which are both aspheric, and the fourth lens element 640 is made of plastic material. Furthermore, the image-side surface 642 of the fourth lens element 640 has at least one convex shape in an off-axis region thereof.

The IR-cut filter 650 is made of glass and located between the fourth lens element 640 and the image plane 660, and will not affect the focal length of the image capturing lens system. The image sensor 670 is disposed on the image plane 660 of the image capturing lens system.

The detailed optical data of the 6th embodiment are shown in Table 11 and the aspheric surface data are shown in Table 12 below.

TABLE 11

Embodiment 6
f = 1.27 mm, Fno = 2.10, HFOV = 44.4 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 2.393 | ASP | 0.280 | Plastic | 1.544 | 55.9 | 3.85 |
| 2 | | −16.057 | ASP | 0.017 | | | | |
| 3 | Ape. Stop | Plano | | 0.044 | | | | |
| 4 | Lens 2 | −30.373 | ASP | 0.755 | Plastic | 1.544 | 55.9 | 0.87 |
| 5 | | −0.468 | ASP | 0.121 | | | | |
| 6 | Lens 3 | −0.246 | ASP | 0.240 | Plastic | 1.639 | 23.5 | −0.90 |
| 7 | | −0.594 | ASP | 0.030 | | | | |
| 8 | Lens 4 | 0.639 | ASP | 0.522 | Plastic | 1.530 | 55.8 | 1.47 |
| 9 | | 2.521 | ASP | 0.400 | | | | |
| 10 | IR-cut filter | Plano | | 0.175 | Glass | 1.517 | 64.2 | — |
| 11 | | Plano | | 0.073 | | | | |
| 12 | Image | Plano | | — | | | | |

Note:
Reference wavelength is 587.6 nm (d-line).

TABLE 12

Aspheric Coefficients

| Surface # | 1 | 2 | 4 | 5 |
|---|---|---|---|---|
| k = | 1.7241E+00 | −8.9754E+01 | −9.0000E+01 | −7.5923E−01 |
| A4 = | 2.1410E−01 | 1.4516E+00 | 1.5168E−01 | −5.4982E−01 |
| A6 = | −2.3810E−01 | −1.0826E+01 | 4.8929E+00 | 2.0791E+00 |
| A8 = | 2.3555E+01 | 1.9495E+02 | −3.2116E+01 | 8.2787E−01 |
| A10 = | −2.5034E+02 | −5.1780E+02 | −2.6801E+03 | −1.4893E+02 |
| A12 = | 1.4357E+03 | −5.7593E+04 | 4.6579E+04 | 1.0534E+03 |
| A14 = | −4.2381E+03 | 9.2351E+05 | −3.3256E+05 | −3.0936E+03 |
| A16 = | 4.9589E+03 | −4.2045E+06 | 9.0327E+05 | 3.3098E+03 |

| Surface # | 6 | 7 | 8 | 9 |
|---|---|---|---|---|
| k = | −9.9704E−01 | −3.7851E+00 | −7.3474E−01 | −2.0751E+00 |
| A4 = | 2.9255E+00 | −1.3600E+00 | −1.2133E+00 | 1.8260E+00 |
| A6 = | −2.4852E+00 | 5.5927E+00 | 3.0817E+00 | −5.9653E+00 |
| A8 = | −5.7718E+01 | −1.8755E+01 | −1.0034E+01 | 9.6816E+00 |
| A10 = | 6.7135E+02 | 7.3016E+01 | 1.9498E+01 | −9.2466E+00 |
| A12 = | −3.0733E+03 | −1.6937E+02 | −2.1549E+01 | 5.1894E+00 |
| A14 = | 6.6780E+03 | 1.9522E+02 | 1.2590E+01 | −1.5760E+00 |
| A16 = | −5.6393E+03 | −8.6932E+01 | −3.0510E+00 | 1.9769E−01 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th Embodiment | | | |
|---|---|---|---|
| f [mm] | 1.27 | f2/f3 | −0.97 |
| Fno | 2.10 | |f/f4| | 0.86 |
| HFOV [deg.] | 44.4 | f/f3 | −1.41 |
| V1 | 55.9 | Td [mm] | 2.009 |
| CT2/(CT1 + CT3 + CT4) | 0.72 | ΣCT/Td | 0.89 |
| (R3 + R4)/(R3 − R4) | 1.03 | Td/tan(HFOV) [mm] | 2.05 |
| f/f1 | 0.33 | FOV [deg.] | 88.8 |

7th Embodiment

Figure 7A:
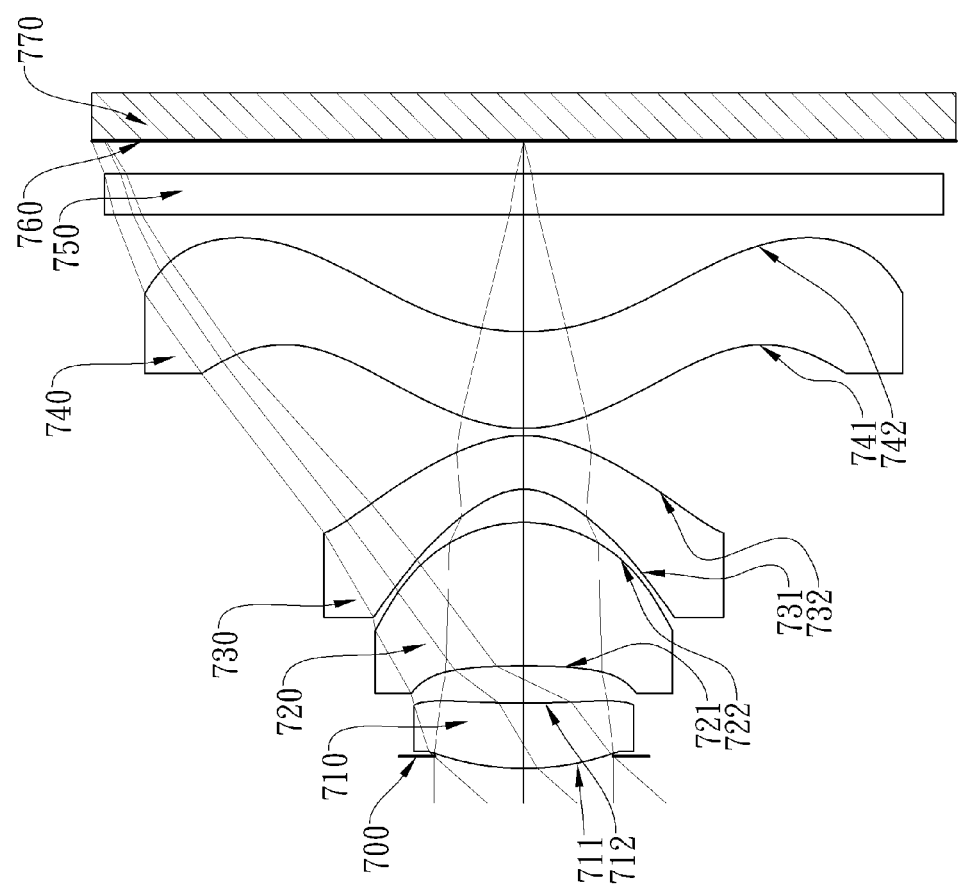
FIG. 7A is a schematic view of an imaging device according to the 7th embodiment of the present disclosure.
Figure 7B:
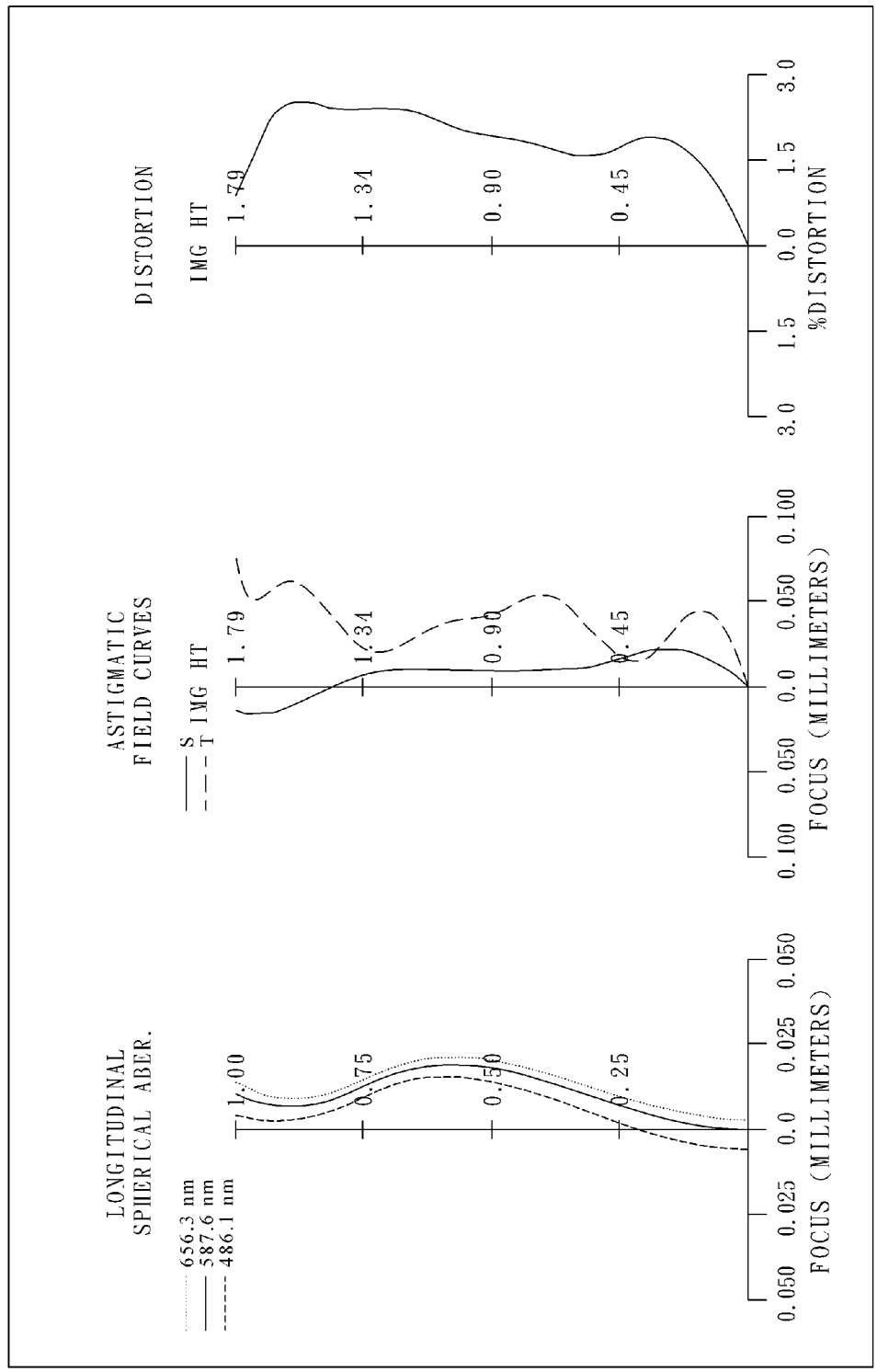
FIG. 7B shows spherical aberration curves, astigmatic field curves and a distortion curve of the imaging device according to the 7th embodiment.

FIG. 7A is a schematic view of an imaging device according to the 7th embodiment of the present disclosure. FIG. 7B shows, in order from left to right, spherical aberration curves, astigmatic field curves and a distortion curve of the imaging device according to the 7th embodiment.

In FIG. 7A, the imaging device includes the image capturing lens system (not otherwise herein labeled) of the present disclosure and an image sensor 770. The image capturing lens system includes, in order from an object side to an image side, an aperture stop 700, a first lens element 710, a second lens element 720, a third lens element 730, a fourth lens element 740, an IR-cut filter 750 and an image plane 760, wherein the image capturing lens system has a total of four lens elements (710-740) with refractive power.

The first lens element 710 with positive refractive power has a convex object-side surface 711 in a paraxial region thereof and a concave image-side surface 712 in a paraxial region thereof, which are both aspheric, and the first lens element 710 is made of plastic material.

The second lens element 720 with positive refractive power has a concave object-side surface 721 in a paraxial region thereof and a convex image-side surface 722 in a paraxial region thereof, which are both aspheric, and the second lens element 720 is made of plastic material.

The third lens element 730 with negative refractive power has a concave object-side surface 731 in a paraxial region thereof and a convex image-side surface 732 in a paraxial region thereof, which are both aspheric, and the third lens element 730 is made of plastic material.

The fourth lens element 740 with positive refractive power has a convex object-side surface 741 in a paraxial region thereof and a concave image-side surface 742 in a paraxial region thereof, which are both aspheric, and the fourth lens element 740 is made of plastic material. Furthermore, the image-side surface 742 of the fourth lens element 740 has at least one convex shape in an off-axis region thereof.

The IR-cut filter 750 is made of glass and located between the fourth lens element 740 and the image plane 760, and will not affect the focal length of the image capturing lens system. The image sensor 770 is disposed on the image plane 760 of the image capturing lens system.

The detailed optical data of the 7th embodiment are shown in Table 13 and the aspheric surface data are shown in Table 14 below.

TABLE 13

Embodiment 7
f = 1.57 mm, Fno = 2.05, HFOV = 48.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.052 | | | | |
| 2 | Lens 1 | 1.142 | ASP | 0.279 | Plastic | 1.544 | 55.9 | 2.84 |
| 3 | | 4.008 | ASP | 0.159 | | | | |
| 4 | Lens 2 | −4.075 | ASP | 0.614 | Plastic | 1.544 | 55.9 | 1.24 |
| 5 | | −0.608 | ASP | 0.142 | | | | |
| 6 | Lens 3 | −0.255 | ASP | 0.230 | Plastic | 1.634 | 23.8 | −1.37 |
| 7 | | −0.487 | ASP | 0.030 | | | | |
| 8 | Lens 4 | 0.636 | ASP | 0.414 | Plastic | 1.535 | 55.7 | 2.35 |
| 9 | | 0.998 | ASP | 0.500 | | | | |
| 10 | IR-cut filter | Plano | | 0.175 | Glass | 1.517 | 64.2 | — |
| 11 | | Plano | | 0.141 | | | | |
| 12 | Image | Plano | | — | | | | |

Note:
Reference wavelength is 587.6 nm (d-line).

TABLE 14

Aspheric Coefficients

| Surface # | 2 | 3 | 4 | 5 |
|---|---|---|---|---|
| k = | −5.4318E−01 | 6.9324E+01 | 6.0179E+01 | −4.8138E−01 |
| A4 = | 1.1275E−01 | −3.4138E−01 | −6.6571E−01 | −8.5384E−02 |
| A6 = | −1.4350E+00 | −2.7321E+00 | 4.9846E−01 | −6.6518E−01 |
| A8 = | 6.0529E+00 | 2.0740E+01 | −4.5807E+00 | −2.1554E−01 |
| A10 = | 4.7148E+01 | −7.0776E+01 | −1.7027E+02 | −7.9977E+00 |
| A12 = | −1.4571E+02 | −1.4998E+03 | 1.2130E+03 | 2.5638E+01 |
| A14 = | −3.8164E+03 | 1.2389E+04 | −4.4615E+03 | −4.3167E+01 |
| A16 = | 1.5882E+04 | −2.9058E+04 | 6.2425E+03 | 7.2938E+01 |

| Surface # | 6 | 7 | 8 | 9 |
|---|---|---|---|---|
| k = | −1.1103E+00 | −3.0258E+00 | −9.3042E−01 | −5.1455E+00 |
| A4 = | 5.4423E+00 | 4.5345E−01 | −7.7223E−01 | 7.0200E−01 |
| A6 = | −3.5666E+01 | −4.9768E+00 | 9.4468E−01 | −1.5850E+00 |
| A8 = | 1.3446E+02 | 1.9752E+01 | −1.3669E+00 | 1.7028E+00 |
| A10 = | −2.5131E+02 | −4.2912E+01 | 1.1409E+00 | −1.1082E+00 |
| A12 = | −7.3665E+01 | 5.3544E+01 | −5.2307E−01 | 4.3302E−01 |
| A14 = | 1.1117E+03 | −3.5702E+01 | 1.2365E−01 | −9.2838E−02 |
| A16 = | −1.2600E+03 | 1.0063E+01 | −1.1645E−02 | 8.3092E−03 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th Embodiment | | | |
|---|---|---|---|
| f [mm] | 1.57 | f2/f3 | −0.91 |
| Fno | 2.05 | |f/f4| | 0.67 |
| HFOV [deg.] | 48.5 | f/f3 | −1.15 |
| V1 | 55.9 | Td [mm] | 1.868 |
| CT2/(CT1 + CT3 + CT4) | 0.67 | ΣCT/Td | 0.82 |
| (R3 + R4)/(R3 − R4) | 1.35 | Td/tan(HFOV) [mm] | 1.65 |
| f/f1 | 0.55 | FOV [deg.] | 97.0 |

8th Embodiment

Figure 8A:
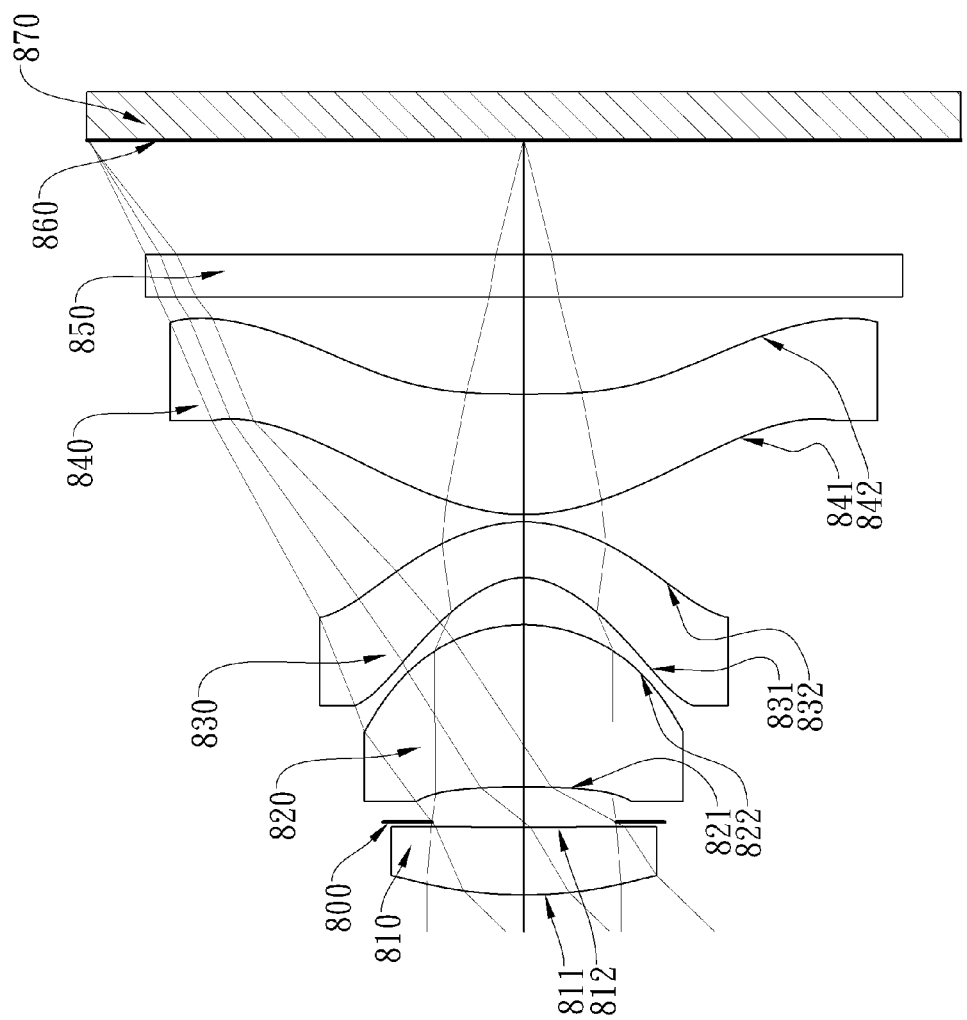
FIG. 8A is a schematic view of an imaging device according to the 8th embodiment of the present disclosure.
Figure 8B:
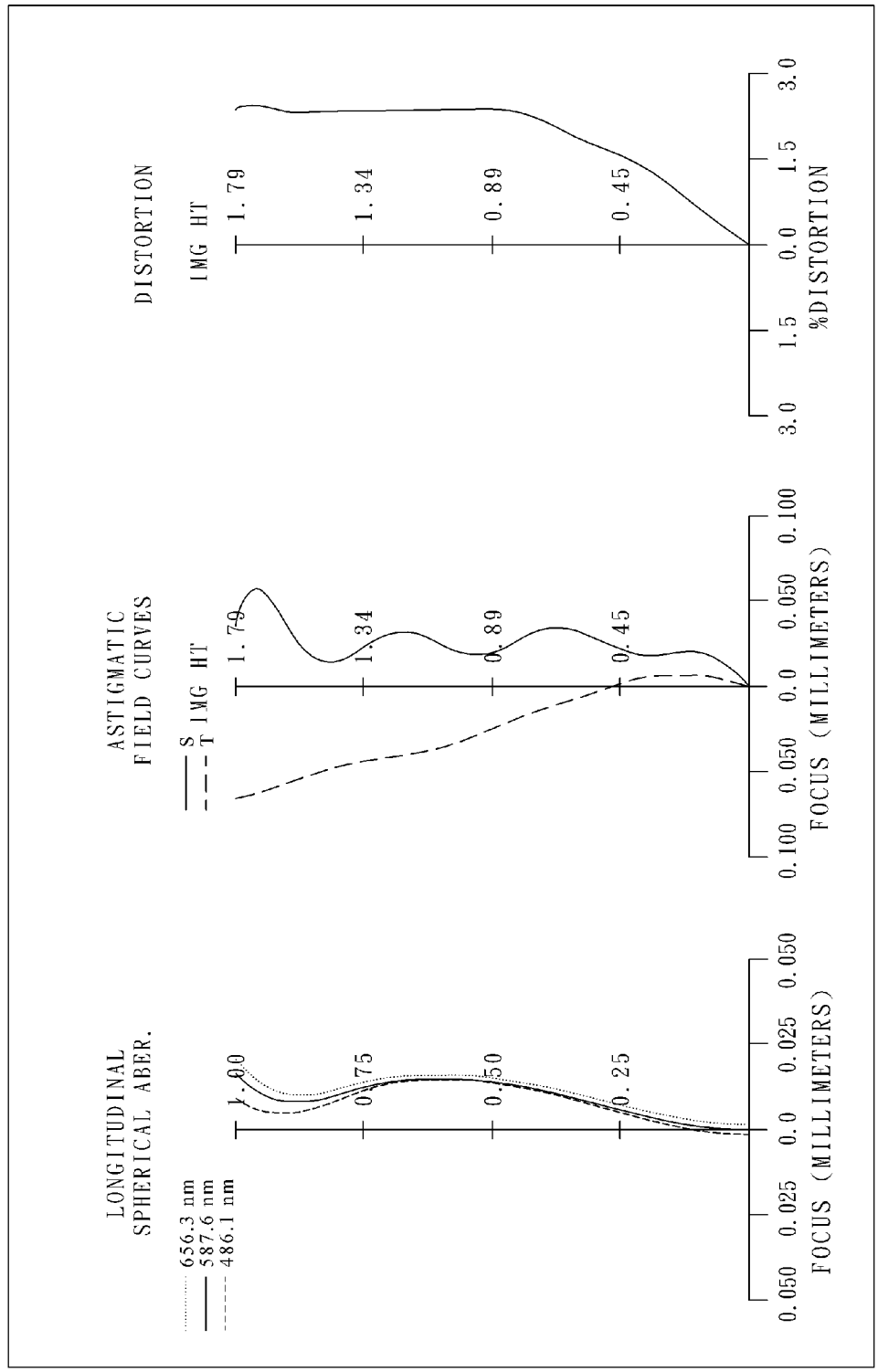
FIG. 8B shows spherical aberration curves, astigmatic field curves and a distortion curve of the imaging device according to the 8th embodiment.

FIG. 8A is a schematic view of an imaging device according to the 8th embodiment of the present disclosure. FIG. 8B shows, in order from left to right, spherical aberration curves, astigmatic field curves and a distortion curve of the imaging device according to the 8th embodiment.

In FIG. 8A, the imaging device includes the image capturing lens system (not otherwise herein labeled) of the present disclosure and an image sensor 870. The image capturing lens system includes, in order from an object side to an image side, a first lens element 810, an aperture stop 800, a second lens element 820, a third lens element 830, a fourth lens element 840, an IR-cut filter 850 and an image plane 860, wherein the image capturing lens system has a total of four lens elements (810-840) with refractive power.

The first lens element 810 with positive refractive power has a convex object-side surface 811 in a paraxial region thereof and a concave image-side surface 812 in a paraxial region thereof, which are both aspheric, and the first lens element 810 is made of plastic material.

The second lens element 820 with positive refractive power has a concave object-side surface 821 in a paraxial region thereof and a convex image-side surface 822 in a paraxial region thereof, which are both aspheric, and the second lens element 820 is made of plastic material.

The third lens element 830 with negative refractive power has a concave object-side surface 831 in a paraxial region thereof and a convex image-side surface 832 in a paraxial region thereof, which are both aspheric, and the third lens element 830 is made of plastic material.

The fourth lens element 840 with positive refractive power has a convex object-side surface 841 in a paraxial region thereof and a concave image-side surface 842 in a paraxial region thereof, which are both aspheric, and the fourth lens element 840 is made of plastic material. Furthermore, the image-side surface 842 of the fourth lens element 840 has at least one convex shape in an off-axis region thereof.

The IR-cut filter 850 is made of glass and located between the fourth lens element 840 and the image plane 860, and will not affect the focal length of the image capturing lens system. The image sensor 870 is disposed on the image plane 860 of the image capturing lens system.

The detailed optical data of the 8th embodiment are shown in Table 15 and the aspheric surface data are shown in Table 16 below.

TABLE 15

Embodiment 8
f = 1.68 mm, Fno = 2.10, HFOV = 46.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 1.787 | ASP | 0.278 | Plastic | 1.544 | 55.9 | 3.81 |
| 2 | | 12.133 | ASP | 0.022 | | | | |
| 3 | Ape. Stop | Plano | | 0.145 | | | | |
| 4 | Lens 2 | −3.839 | ASP | 0.668 | Plastic | 1.544 | 55.9 | 1.38 |
| 5 | | −0.668 | ASP | 0.194 | | | | |
| 6 | Lens 3 | −0.273 | ASP | 0.230 | Plastic | 1.639 | 23.5 | −1.18 |
| 7 | | −0.569 | ASP | 0.030 | | | | |
| 8 | Lens 4 | 0.784 | ASP | 0.496 | Plastic | 1.530 | 55.8 | 1.65 |
| 9 | | 5.992 | ASP | 0.400 | | | | |
| 10 | IR-cut filter | Plano | | 0.175 | Glass | 1.517 | 64.2 | — |
| 11 | | Plano | | 0.472 | | | | |
| 12 | Image | Plano | | — | | | | |

Note:
Reference wavelength is 587.6 nm (d-line).

TABLE 16

Aspheric Coefficients

| Surface # | 1 | 2 | 4 | 5 |
|---|---|---|---|---|
| k = | −1.3232E+00 | 5.3151E+01 | 5.1693E+01 | −5.9308E−01 |
| A4 = | 1.6281E−02 | −1.2122E−02 | −2.5602E−01 | −1.1508E−01 |
| A6 = | 1.5823E−01 | −1.1940E+00 | −1.0332E+00 | −6.8787E−01 |
| A8 = | 5.9941E−01 | 1.2093E+01 | 1.0464E+01 | −9.7964E−02 |
| A10 = | −1.3812E+01 | −2.0003E+01 | −1.9940E+02 | −6.2734E+00 |
| A12 = | 4.5317E+01 | −1.4998E+03 | 1.2130E+03 | 2.8529E+01 |
| A14 = | −4.4460E+01 | 1.2389E+04 | −4.4615E+03 | −4.4589E+01 |
| A16 = | −4.7734E+01 | −2.9058E+04 | 6.2425E+03 | 2.7908E+01 |

| Surface # | 6 | 7 | 8 | 9 |
|---|---|---|---|---|
| k = | −1.0578E+00 | −3.0032E+00 | −8.6121E−01 | 5.6610E+00 |
| A4 = | 4.0391E+00 | 9.4553E−02 | −6.6716E−01 | 7.7788E−01 |
| A6 = | −2.6571E+01 | −4.4170E+00 | 1.1395E+00 | −1.2944E+00 |
| A8 = | 1.2417E+02 | 1.9085E+01 | −1.7698E+00 | 1.0967E+00 |
| A10 = | −3.9394E+02 | −4.1568E+01 | 1.6239E+00 | −5.7605E−01 |
| A12 = | 8.2748E+02 | 5.5376E+01 | −8.6944E−01 | 1.8609E−01 |
| A14 = | −9.7331E+02 | −4.1902E+01 | 2.5418E−01 | −3.3617E−02 |
| A16 = | 4.7213E+02 | 1.3653E+01 | −3.1838E−02 | 2.5144E−03 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th Embodiment | | | |
|---|---|---|---|
| f [mm] | 1.68 | f2/f3 | −1.17 |
| Fno | 2.10 | |f/f4| | 1.02 |
| HFOV [deg.] | 46.0 | f/f3 | −1.42 |
| V1 | 55.9 | Td [mm] | 2.063 |
| CT2/(CT1 + CT3 + CT4) | 0.67 | ΣCT/Td | 0.81 |
| (R3 + R4)/(R3 − R4) | 1.42 | Td/tan(HFOV) [mm] | 1.99 |
| f/f1 | 0.44 | FOV [deg.] | 92.0 |

9th Embodiment

Figure 9A:
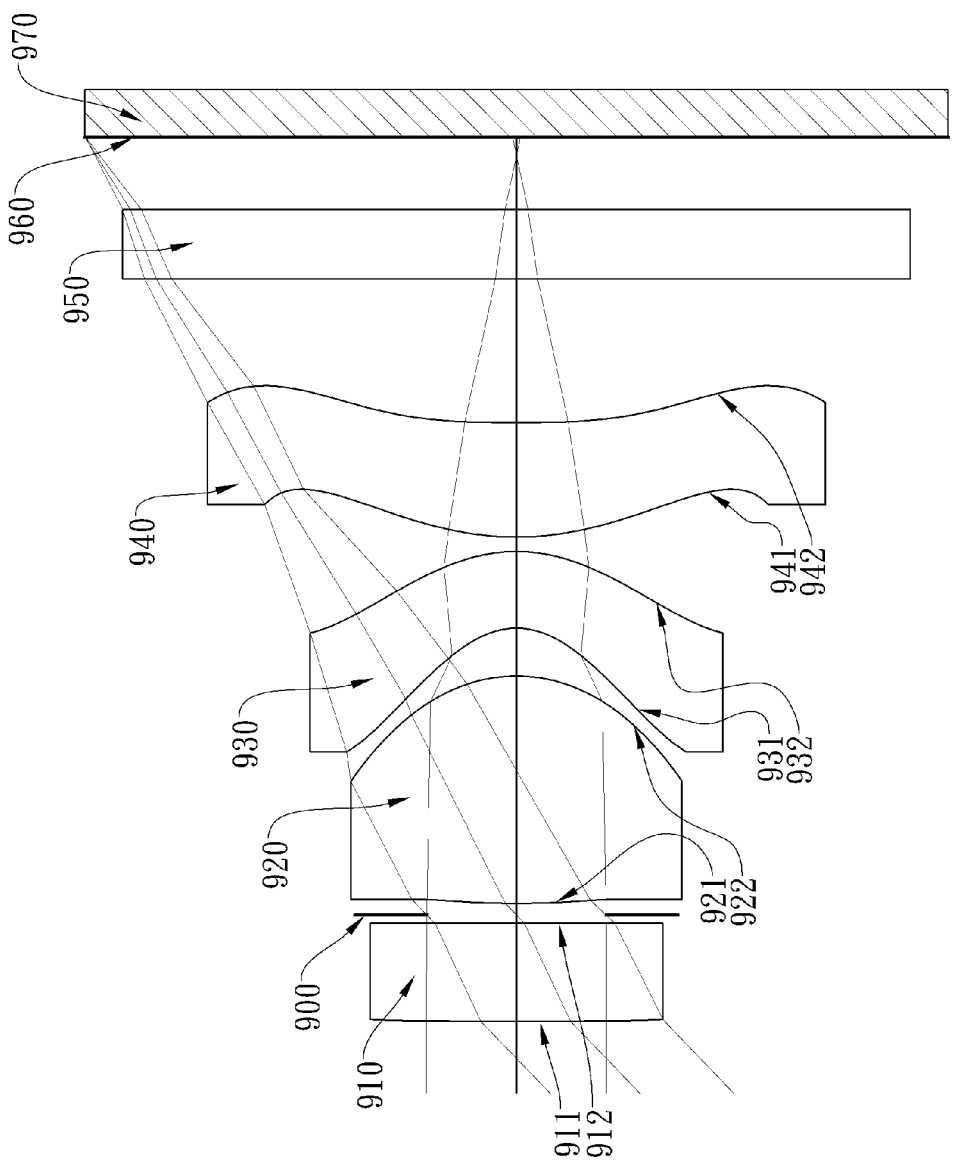
FIG. 9A is a schematic view of an imaging device according to the 9th embodiment of the present disclosure.
Figure 9B:
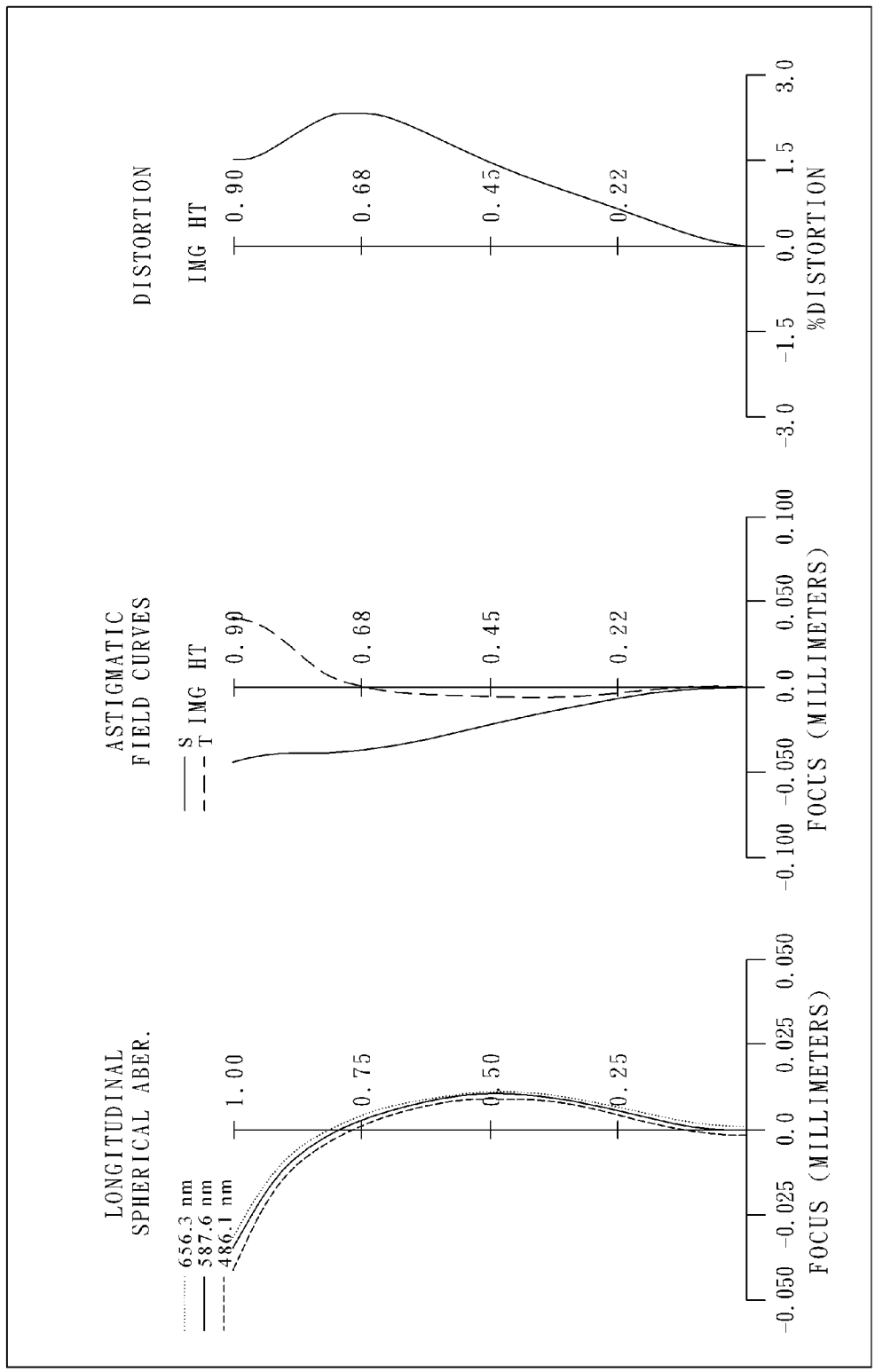
FIG. 9B shows spherical aberration curves, astigmatic field curves and a distortion curve of the imaging device according to the 9th embodiment.

FIG. 9A is a schematic view of an imaging device according to the 9th embodiment of the present disclosure. FIG. 9B shows, in order from left to right, spherical aberration curves, astigmatic field curves and a distortion curve of the imaging device according to the 9th embodiment.

In FIG. 9A, the imaging device includes the image capturing lens system (not otherwise herein labeled) of the present disclosure and an image sensor 970. The image capturing lens system includes, in order from an object side to an image side, a first lens element 910, an aperture stop 900, a second lens element 920, a third lens element 930, a fourth lens element 940, an IR-cut filter 950 and an image plane 960, wherein the image capturing lens system has a total of four lens elements (910-940) with refractive power.

The first lens element 910 with positive refractive power has a convex object-side surface 911 in a paraxial region thereof and a convex image-side surface 912 in a paraxial region thereof, which are both aspheric, and the first lens element 910 is made of plastic material.

The second lens element 920 with positive refractive power has a convex object-side surface 921 in a paraxial region thereof and a convex image-side surface 922 in a paraxial region thereof, which are both aspheric, and the second lens element 920 is made of plastic material.

The third lens element 930 with negative refractive power has a concave object-side surface 931 in a paraxial region thereof and a convex image-side surface 932 in a paraxial region thereof, which are both aspheric, and the third lens element 930 is made of plastic material.

The fourth lens element 940 with positive refractive power has a convex object-side surface 941 in a paraxial region thereof and a concave image-side surface 942 in a paraxial region thereof, which are both aspheric, and the fourth lens element 940 is made of plastic material. Furthermore, the image-side surface 942 of the fourth lens element 940 has at least one convex shape in an off-axis region thereof.

The IR-cut filter 950 is made of glass and located between the fourth lens element 940 and the image plane 960, and will not affect the focal length of the image capturing lens system. The image sensor 970 is disposed on the image plane 960 of the image capturing lens system.

The detailed optical data of the 9th embodiment are shown in Table 17 and the aspheric surface data are shown in Table 18 below.

TABLE 17

Embodiment 9
f = 0.92 mm, Fno = 2.45, HFOV = 43.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 100.000 | ASP | 0.205 | Plastic | 1.633 | 23.4 | 13.12 |
| 2 | | −9.046 | ASP | 0.017 | | | | |
| 3 | Ape. Stop | Plano | | 0.024 | | | | |
| 4 | Lens 2 | 1.695 | ASP | 0.475 | Plastic | 1.544 | 55.9 | 0.54 |
| 5 | | −0.319 | ASP | 0.100 | | | | |
| 6 | Lens 3 | −0.148 | ASP | 0.160 | Plastic | 1.634 | 23.8 | −0.65 |
| 7 | | −0.329 | ASP | 0.030 | | | | |
| 8 | Lens 4 | 0.595 | ASP | 0.239 | Plastic | 1.530 | 55.8 | 1.28 |
| 9 | | 4.109 | ASP | 0.300 | | | | |
| 10 | IR-cut filter | Plano | | 0.145 | Glass | 1.517 | 64.2 | — |
| 11 | | Plano | | 0.151 | | | | |
| 12 | Image | Plano | | — | | | | |

Note:
Reference wavelength is 587.6 nm (d-line).

TABLE 18

Aspheric Coefficients

| Surface # | 1 | 2 | 4 | 5 |
|---|---|---|---|---|
| k = | −9.0000E+01 | 9.0000E+01 | 3.3243E+01 | −6.6437E−01 |
| A4 = | 2.5656E−01 | 2.4894E+00 | −1.9077E+00 | −1.5093E+00 |
| A6 = | −1.0613E+00 | −9.5530E+01 | −1.3506E+01 | 4.3096E+00 |
| A8 = | 1.6769E+02 | 3.0126E+03 | 1.0928E+01 | 1.6065E+02 |
| A10 = | −3.7307E+03 | −2.3016E+04 | −4.4021E+04 | −2.9203E+03 |
| A12 = | 3.9786E+04 | −1.5960E+06 | 1.2908E+06 | 2.9181E+04 |
| A14 = | −2.1485E+05 | 4.6819E+07 | −1.6860E+07 | −1.5683E+05 |
| A16 = | 4.5990E+05 | −3.8994E+08 | 8.3772E+07 | 3.0696E+05 |

| Surface # | 6 | 7 | 8 | 9 |
|---|---|---|---|---|
| k = | −1.0921E+00 | −2.4247E+00 | −6.0015E−01 | 3.3921E+01 |
| A4 = | 8.8579E+00 | −1.7457E+00 | −1.8642E+00 | 3.4965E+00 |
| A6 = | −9.7201E+00 | 2.7059E+01 | 4.2816E+00 | −1.7965E+01 |
| A8 = | −4.6210E+02 | −1.6609E+02 | −3.6842E+01 | 3.3243E+01 |
| A10 = | 1.0079E+04 | 1.0699E+03 | 9.4802E+01 | −3.1178E+01 |
| A12 = | −8.5169E+04 | −4.7330E+03 | −1.9140E+02 | 1.8452E+01 |
| A14 = | 3.3855E+05 | 1.0605E+04 | 3.6755E+02 | −3.7397E+01 |
| A16 = | −5.2300E+05 | −7.7191E+03 | −9.3365E+02 | 3.7762E+01 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th Embodiment | | | |
|---|---|---|---|
| f [mm] | 0.92 | f2/f3 | −0.83 |
| Fno | 2.45 | |f/f4| | 0.72 |
| HFOV [deg.] | 43.9 | f/f3 | −1.42 |
| V1 | 23.4 | Td [mm] | 1.250 |
| CT2/(CT1 + CT3 + CT4) | 0.79 | ΣCT/Td | 0.86 |
| (R3 + R4)/(R3 − R4) | 0.68 | Td/tan(HFOV) [mm] | 1.30 |
| f/f1 | 0.07 | FOV [deg.] | 87.8 |

10th Embodiment

Figure 10A:
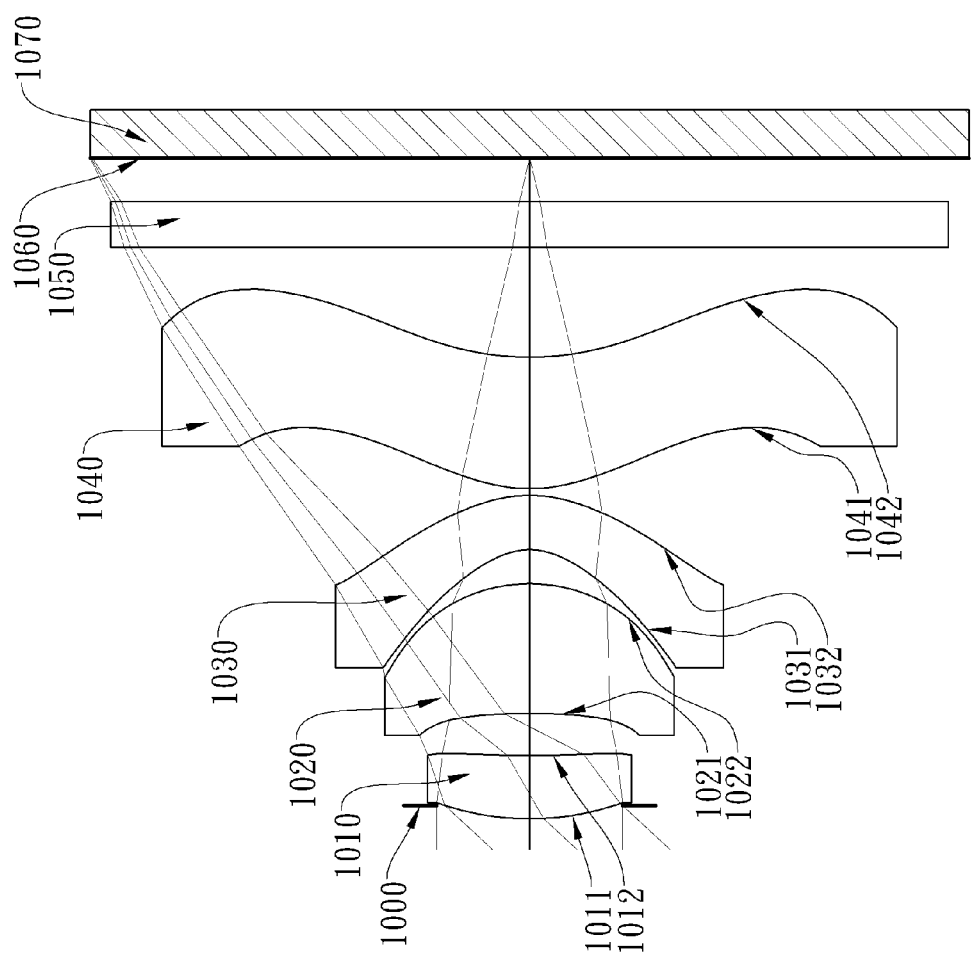
FIG. 10A is a schematic view of an imaging device according to the 10th embodiment of the present disclosure.
Figure 10B:
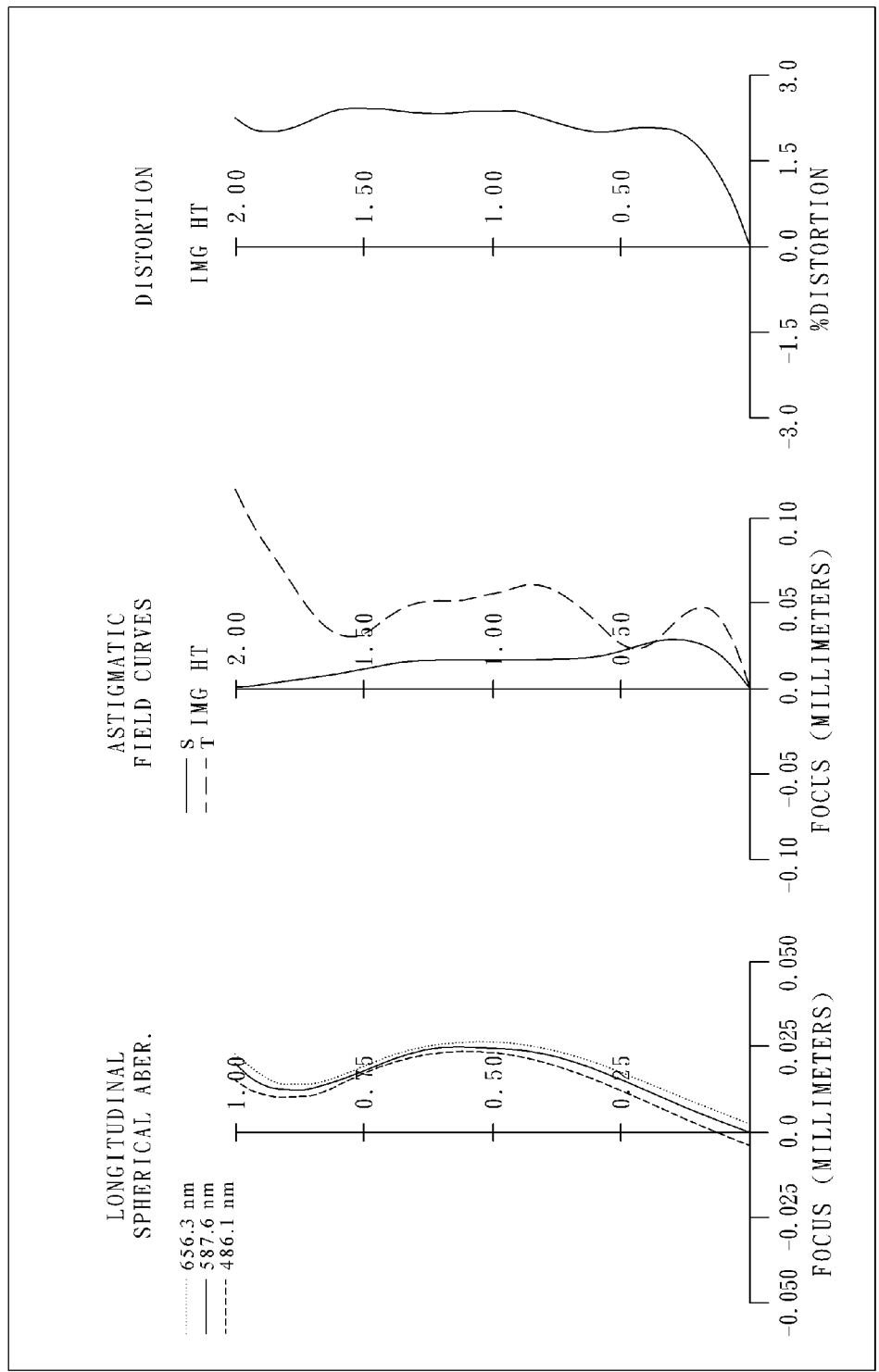
FIG. 10B shows spherical aberration curves, astigmatic field curves and a distortion curve of the imaging device according to the 10th embodiment.

FIG. 10A is a schematic view of an imaging device according to the 10th embodiment of the present disclosure. FIG. 10B shows, in order from left to right, spherical aberration curves, astigmatic field curves and a distortion curve of the imaging device according to the 10th embodiment.

In FIG. 10A, the imaging device includes the image capturing lens system (not otherwise herein labeled) of the present disclosure and an image sensor 1070. The image capturing lens system includes, in order from an object side to an image side, an aperture stop 1000, a first lens element 1010, a second lens element 1020, a third lens element 1030, a fourth lens element 1040, an IR-cut filter 1050 and an image plane 1060, wherein the image capturing lens system has a total of four lens elements (1010-1040) with refractive power.

The first lens element 1010 with positive refractive power has a convex object-side surface 1011 in a paraxial region thereof and a concave image-side surface 1012 in a paraxial region thereof, which are both aspheric, and the first lens element 1010 is made of plastic material.

The second lens element 1020 with positive refractive power has a concave object-side surface 1021 in a paraxial region thereof and a convex image-side surface 1022 in a paraxial region thereof, which are both aspheric, and the second lens element 1020 is made of plastic material.

The third lens element 1030 with negative refractive power has a concave object-side surface 1031 in a paraxial region thereof and a convex image-side surface 1032 in a paraxial region thereof, which are both aspheric, and the third lens element 1030 is made of plastic material.

The fourth lens element 1040 with positive refractive power has a convex object-side surface 1041 in a paraxial region thereof and a concave image-side surface 1042 in a paraxial region thereof, which are both aspheric, and the fourth lens element 1040 is made of plastic material. Furthermore, the image-side surface 1042 of the fourth lens element 1040 has at least one convex shape in an off-axis region thereof.

The IR-cut filter 1050 is made of glass and located between the fourth lens element 1040 and the image plane 1060, and will not affect the focal length of the image capturing lens system. The image sensor 1070 is disposed on the image plane 1060 of the image capturing lens system.

The detailed optical data of the 10th embodiment are shown in Table 19 and the aspheric surface data are shown in Table 20 below.

TABLE 19

Embodiment 10
f = 1.80 mm, Fno = 2.12, HFOV = 47.2 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.060 | | | | |
| 2 | Lens 1 | 1.246 | ASP | 0.289 | Plastic | 1.544 | 55.9 | 2.97 |
| 3 | | 5.018 | ASP | 0.191 | | | | |
| 4 | Lens 2 | −3.749 | ASP | 0.593 | Plastic | 1.544 | 55.9 | 1.57 |
| 5 | | −0.733 | ASP | 0.156 | | | | |
| 6 | Lens 3 | −0.288 | ASP | 0.248 | Plastic | 1.634 | 23.8 | −1.33 |
| 7 | | −0.584 | ASP | 0.030 | | | | |
| 8 | Lens 4 | 0.704 | ASP | 0.601 | Plastic | 1.535 | 55.7 | 2.05 |
| 9 | | 1.382 | ASP | 0.500 | | | | |
| 10 | IR-cut filter | Plano | | 0.210 | Glass | 1.517 | 64.2 | — |
| 11 | | Plano | | 0.198 | | | | |
| 12 | Image | Plano | | — | | | | |

Note:
Reference wavelength is 587.6 nm (d-line).
The effective radius of Surface 9 is 1.676 mm.

TABLE 20

Aspheric Coefficients

| Surface # | 2 | 3 | 4 | 5 |
|---|---|---|---|---|
| k = | −5.0585E−01 | 9.0000E+01 | 3.6143E+01 | −3.9805E−01 |
| A4 = | 8.6099E−02 | −2.2970E−01 | −4.8540E−01 | −1.5034E−01 |
| A6 = | −9.1382E−01 | −1.8900E+00 | 2.7508E−01 | −5.1276E−01 |
| A8 = | 1.9706E+00 | 1.1233E+01 | −2.0152E+00 | −1.5742E−01 |
| A10 = | 1.9492E+01 | −3.0654E+01 | −6.3534E+01 | −3.0117E+00 |
| A12 = | −3.5519E+01 | −4.4967E+02 | 3.6120E+02 | 7.3424E+00 |
| A14 = | −8.0910E+02 | 2.9681E+03 | −1.0702E+03 | −1.0241E+01 |
| A16 = | 2.4600E+03 | −5.5960E+03 | 1.2022E+03 | 1.7746E+01 |

| Surface # | 6 | 7 | 8 | 9 |
|---|---|---|---|---|
| k = | −1.1070E+00 | −2.9894E+00 | −9.3316E−01 | −5.2865E+00 |
| A3 = | | | −1.4739E−01 | 5.0831E−01 |
| A4 = | 4.3809E+00 | 4.3352E−01 | −3.5412E+00 | 2.6512E+00 |
| A5 = | | | 2.4672E−02 | 1.3099E−01 |
| A6 = | −2.6437E+01 | −3.7903E+00 | 1.0303E+01 | −3.1255E+01 |
| A7 = | | | 3.7082E−02 | 2.0652E−01 |
| A8 = | 9.1296E+01 | 1.0965E+01 | −3.1616E+01 | 1.1148E+02 |
| A9 = | | | −2.2687E−03 | −9.0797E−01 |
| A10 = | −1.5853E+02 | −1.4675E+01 | 6.3626E+01 | −2.2327E+02 |
| A11 = | | | −2.3794E−03 | 3.6058E−01 |
| A12 = | 8.3141E+00 | 7.7310E+00 | −7.5604E+01 | 2.6201E+02 |
| A13 = | | | 8.0966E−03 | 1.7201E−01 |
| A14 = | 3.8963E+02 | 1.2159E+00 | 4.7652E+01 | −1.7041E+02 |
| A15 = | | | −5.5857E−02 | 1.0396E−01 |
| A16 = | −3.9976E+02 | −1.8447E+00 | −1.2153E+01 | 4.7523E+01 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th Embodiment | | | |
|---|---|---|---|
| f [mm] | 1.80 | f2/f3 | −1.18 |
| Fno | 2.12 | |f/f4| | 0.88 |
| HFOV [deg.] | 47.2 | f/f3 | −1.35 |
| V1 | 55.9 | Td [mm] | 2.108 |
| CT2/(CT1 + CT3 + CT4) | 0.52 | ΣCT/Td | 0.82 |
| (R3 + R4)/(R3 − R4) | 1.49 | Td/tan(HFOV) [mm] | 1.95 |
| f/f1 | 0.61 | FOV [deg.] | 94.4 |

The foregoing description, for purpose of explanation, has been described with reference to specific embodiments. It is to be noted that TABLES 1-20 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An image capturing lens system comprising, in order from an object side to an image side:
   a first lens element having refractive power;
   a second lens element with positive refractive power having a convex image-side surface in a paraxial region thereof;
   a third lens element with negative refractive power having a concave object-side surface in a paraxial region thereof and a convex image-side surface in a paraxial region thereof; and
   a fourth lens element with refractive power having a concave image-side surface in a paraxial region thereof, wherein both of an object-side surface and the image-side surface of the fourth lens element are aspheric, and the image-side surface of the fourth lens element has at least one convex shape in an off-axis region thereof;
   wherein the image capturing lens system has a total of four lens elements with refractive power, an axial distance between an object-side surface of the first lens element and the image-side surface of the fourth lens element is Td, half of a maximal field of view of the image capturing lens system is HFOV, a focal length of the image capturing lens system is f, a focal length of the fourth lens element is f4, a focal length of the second lens element is f2, a focal length of the third lens element is f3, and the following conditions are satisfied:

0.5 mm<$Td$<3.2 mm;

1.0 mm<$Td$/tan(HFOV)<3.75 mm;

|$f/f4$|<1.20; and $f2/f3$<−0.65.

2. The image capturing lens system of claim 1, wherein the fourth lens element has the object-side surface being convex in a paraxial region thereof.

3. The image capturing lens system of claim 2, wherein the focal length of the image capturing lens system is f, a focal length of the first lens element is f1, and the following condition is satisfied:

−0.25<$f/f1$<0.75.

4. The image capturing lens system of claim 2, wherein the axial distance between the object-side surface of the first lens element and the image-side surface of the fourth lens element is Td, and the following condition is satisfied:

0.8 mm<$Td$<2.5 mm.

5. The image capturing lens system of claim 2, wherein an f-number of the image capturing lens system is Fno, and the following condition is satisfied:

1.40<$Fno$≤2.25.

6. The image capturing lens system of claim 2, wherein a curvature radius of the object-side surface of the second lens element is R3, a curvature radius of the image-side surface of the second lens element is R4, and the following condition is satisfied:

0.5<($R3+R4$)/($R3−R4$)<2.5.

7. The image capturing lens system of claim 2, wherein the focal length of the image capturing lens system is f, and the following condition is satisfied:

0.5 mm<$f$<2.0 mm.

8. The image capturing lens system of claim 1, wherein the first lens element has a convex object-side surface in a paraxial region thereof.

9. The image capturing lens system of claim 8, wherein the axial distance between the object-side surface of the first lens element and the image-side surface of the fourth lens element is Td, half of the maximal field of view of the image capturing lens system is HFOV, and the following condition is satisfied:

1.2 mm<$Td$/tan(HFOV)<2.75 mm.

10. The image capturing lens system of claim 8, wherein a sum of the central thicknesses of the first lens element, the second lens element, the third lens element, and the fourth lens element is ΣCT, the axial distance between the object-side surface of the first lens element and the image-side surface of the fourth lens element is Td, and the following condition is satisfied:

0.80<$ΣCT/Td$<0.95.

11. The image capturing lens system of claim 8, wherein an Abbe number of the first lens element is V1, and the following condition is satisfied:

45<$V1$.

12. The image capturing lens system of claim 8, wherein a central thickness of the second lens element is CT2, a central thickness of the first lens element is CT1, a central thickness of the third lens element is CT3, a central thickness of the fourth lens element is CT4, and the following condition is satisfied:

0.65<$CT2/(CT1+CT3+CT4)$<2.0.

13. An imaging device, comprising:
the image capturing lens system of claim 1; and
an image sensor.

14. A mobile terminal, comprising:
the imaging device of claim 13.

15. An image capturing lens system comprising, in order from an object side to an image side:
a first lens element having refractive power;
a second lens element with positive refractive power having a convex image-side surface in a paraxial region thereof;
a third lens element with negative refractive power having a concave object-side surface in a paraxial region thereof and a convex image-side surface in a paraxial region thereof; and
a fourth lens element with refractive power having a concave image-side surface in a paraxial region thereof, wherein both of an object-side surface and the image-side surface of the fourth lens element are aspheric, and the image-side surface of the fourth lens element has at least one convex shape in an off-axis region thereof;
wherein the image capturing lens system has a total of four lens elements with refractive power, an axial distance between an object-side surface of the first lens element and the image-side surface of the fourth lens element is Td, half of a maximal field of view of the image capturing lens system is HFOV, a focal length of the image capturing lens system is f, a focal length of the fourth lens element is f4, a focal length of the third lens element is f3, and the following conditions are satisfied:

0.5 mm<$Td$<3.2 mm;

1.0 mm<$Td$/tan(HFOV)<3.75 mm;

|$f/f4$|<1.20; and

−2.0<$f/f3$<−0.95.

16. The image capturing lens system of claim 15, wherein an Abbe number of the first lens element is V1, and the following condition is satisfied:

45<$V1$.

17. The image capturing lens system of claim 15, wherein the focal length of the image capturing lens system is f, a focal length of the first lens element is f1, and the following condition is satisfied:

−0.25<$f/f1$<0.75.

18. The image capturing lens system of claim 15, wherein a maximal field of view of the image capturing lens system is FOV, and the following condition is satisfied:

80 degrees<FOV<110 degrees.

19. The image capturing lens system of claim 15, wherein the axial distance between the object-side surface of the first lens element and the image-side surface of the fourth lens element is Td, and the following condition is satisfied:

0.8 mm<$Td$<2.5 mm.

20. The image capturing lens system of claim 15, wherein a focal length of the second lens element is f2, the focal length of the third lens element is f3, and the following condition is satisfied:

$f2/f3$<−0.75.

21. An image capturing lens system comprising, in order from an object side to an image side:
- a first lens element having refractive power;
- a second lens element with positive refractive power having a convex image-side surface in a paraxial region thereof;
- a third lens element with negative refractive power having a concave object-side surface in a paraxial region thereof and a convex image-side surface in a paraxial region thereof; and
- a fourth lens element with refractive power having a concave image-side surface in a paraxial region thereof, wherein both of an object-side surface and the image-side surface of the fourth lens element are aspheric, and the image-side surface of the fourth lens element has at least one convex shape in an off-axis region thereof;

wherein the image capturing lens system has a total of four lens elements with refractive power, an axial distance between the object-side surface of the first lens element and the image-side surface of the fourth lens element is Td, half of a maximal field of view of the image capturing lens system is HFOV, a focal length of the image capturing lens system is f, a focal length of the fourth lens element is f4, an f-number of the image capturing lens system is Fno, and the following conditions are satisfied:

0.5 mm<$Td$<3.2 mm;

1.0 mm<$Td/\tan(\text{HFOV})$<3.75 mm;

$|f/f4|$<1.20; and 1.40<$Fno$≤2.25.

22. The image capturing lens system of claim 21, wherein a focal length of the second lens element is f2, a focal length of the third lens element is f3, and the following condition is satisfied:

$f2/f3$<−0.65.

23. The image capturing lens system of claim 21, wherein an Abbe number of the first lens element is V1, and the following condition is satisfied:

45<$V1$.

24. The image capturing lens system of claim 21, wherein the first lens element has positive refractive power, the focal length of the image capturing lens system is f, a focal length of the first lens element is f1, and the following condition is satisfied:

0.25<$f/f1$<0.75.

25. The image capturing lens system of claim 21, wherein a maximal field of view of the image capturing lens system is FOV, and the following condition is satisfied:

80 degrees<FOV<110 degrees.

26. The image capturing lens system of claim 21, wherein a central thickness of the second lens element is CT2, a central thickness of the first lens element is CT1, a central thickness of the third lens element is CT3, a central thickness of the fourth lens element is CT4, and the following condition is satisfied:

0.65<$CT2/(CT1+CT3+CT4)$<2.0.

* * * * *